US012776587B2

(12) United States Patent
Choubar

(10) Patent No.: US 12,776,587 B2
(45) Date of Patent: Oct. 27, 2026

(54) DUAL CIRCULAR-POLARIZED ORBITAL ANGULAR MOMENTUM ANTENNAS WITH ELECTRONICAL BEAM STEERING PROPERTIES AND SYSTEMS AND METHODS OF USING THE SAME

(71) Applicant: HUAWEI TECHNOLOGIES CO., LTD., Shenzhen (CN)

(72) Inventor: Mohammad Akbari Choubar, Kanata (CA)

(73) Assignee: HUAWEI TECHNOLGIES CO., LTD., Shenzhen (CN)

( * ) Notice: Subject to any disclaimer, the term of this patent is extended or adjusted under 35 U.S.C. 154(b) by 54 days.

(21) Appl. No.: 18/938,515

(22) Filed: Nov. 6, 2024

(65) Prior Publication Data

US 2026/0128532 A1 May 7, 2026

(51) Int. Cl.
*H01Q 21/06* (2006.01)
*H01Q 3/26* (2006.01)
*H04B 7/06* (2006.01)

(52) U.S. Cl.
CPC ............ *H01Q 21/061* (2013.01); *H01Q 3/26* (2013.01); *H04B 7/0617* (2013.01)

(58) Field of Classification Search
CPC ............................... H01Q 21/061; H01Q 3/26
See application file for complete search history.

(56) References Cited

U.S. PATENT DOCUMENTS 11,088,752 B1 8/2021 Klemes et al.
2024/0322452 A1* 9/2024 Yamada ............... H04B 7/0617

FOREIGN PATENT DOCUMENTS

WO WO-2023283797 A1 * 1/2023 ............... H04L 5/04
WO 2024065506 A1 4/2024
WO 2025118105 A1 6/2025
WO 2025227270 A1 11/2025

OTHER PUBLICATIONS

Kazuyuki Seo. "Planar Microstrip-To-Waveguide Transition in Millimeter-Wave Band" from chapter 11 (pp. 249-277) of the book "Advancement in Microstrip Antennas with Recent Applications" published on Mar. 6, 2013.

* cited by examiner

*Primary Examiner* — Hoang V Nguyen
(74) *Attorney, Agent, or Firm* — Tim Tingkang Xia, Esq.; Troutman Pepper Locke LLP

(57) ABSTRACT

Antennas, systems, and methods for electronically steering an Orbital Angular Momentum (OAM) beam carrying multiple OAM modes with dual circular-polarization is presented. An OAM antenna includes a plurality of concentric arrays and at least one electromagnetic signal confining structure between neighboring concentric arrays. Each concentric array has a respective plurality of dual circular-polarized (CP) waveguide antenna elements collectively operable to emit a respective OAM beam component carrying one or more dual CP OAM modes. Dual CP antenna elements of a concentric array are coupled to a feed structure via respective bottom ends thereof. Each feed structure is configured to process signals in accordance with the one or more OAM modes associated with a corresponding dual CP waveguide antenna element and in accordance with beam-steering parameters.

20 Claims, 21 Drawing Sheets

DUAL CIRCULAR-POLARIZED ORBITAL ANGULAR MOMENTUM ANTENNAS WITH ELECTRONICAL BEAM STEERING PROPERTIES AND SYSTEMS AND METHODS OF USING THE SAME

TECHNICAL FIELD

The present disclosure pertains to the field of wireless antennas, and in particular to apparatuses, systems, and methods for generating and steering an electromagnetic beam carrying multiple dual circular-polarized Orbital Angular Momentum (OAM) modes using concentric arrays of dual circular-polarized antenna elements.

BACKGROUND

The future generation of wireless networks (e.g., sixth generation of wireless communication (6G)) will offer unprecedented performance in terms of data rate, latency and energy efficiency, and connection density. One of the key technologies that will enable future generations of wireless communication is the use of extremely large-scale antenna arrays, which can create highly directional beams to focus the electromagnetic (EM) energy towards the intended receivers. These beams can be steered in the far-field region, where the EM waves propagate as plane waves, or in the near-field region, where the EM waves have spherical wave fronts.

OAM, or orbital angular momentum, is a property of EM waves that describes the rotation of the wave front around the propagation axis. OAM can be used to create multiple orthogonal modes of EM waves, each carrying a different amount of OAM, and thus increase the spectral efficiency of wireless communication.

Due to its ability to provide dependable and effective wireless communication, electronically beam steered antenna systems have become a significant component of mobile applications. These antennas employ cutting-edge technologies to steer the beam in a specified direction, improving signal quality and coverage, by varying the phase and amplitude of each feeding probe.

For example, to follow a moving target, such as a user or a base station, the OAM beam steering antenna for mobile applications can dynamically track and modify their orientation. A beam steering antenna is a useful choice for future generation mobile networks (e.g., 6G) since it can provide enhanced spectral efficiency, reduced interference, and optimal signal intensity.

Challenges arise in generating a highly directional EM beam carrying multiple OAM modes steerable azimuthally and having an elevation steering range suitable for mobile wireless applications. Mechanically-steered antenna designs for steering an EM beam typically have high associated costs and are limited in steering response time and accuracy by movement of mechanical components of the antenna. Coaxial antenna designs are prone to phase adjustment issues and impedance matching problem between a transmitter and receiver. Azimuthal phase ripple is a common problem in OAM antenna designs impacting the steering performance of the antenna. Stacked uniform circular arrays (UCAs) antenna designs are prone to coupling and EM interference between individual UCAs. In addition, OAM antenna systems known in the art are bulky, have a limited scan range, and/or are prone to poor radiating performance (e.g. deteriorated side lobe level, insufficient directivity, high loss, poor quality of phase calibration, and/or low efficiency) for practical wireless application.

Therefore, there is a need for systems and methods for generating and steering an OAM beam that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Aspects of the present disclosure provide for an antenna array which can be used to generate and transmit one or more EM beams carrying multiple OAM modes carrying dual circular-polarization properties. The EM beams are generated via beamforming techniques and are also steerable by suitable adjustments (e.g. gain and phase adjustments) made in association with such beamforming. The present disclosure provides for various design features of the antenna array, which are considered beneficial. These design features include but are not necessarily limited to: the use of multiple concentric arrays (for example, uniform circular arrays (UCAs)) of dual circular-polarized (CP) waveguide antenna elements; each concentric transmitting a different subset of one or more OAM modes; dual CP waveguide antenna element numbering and physical dimensioning of the multiple concentric arrays to create an effective overall antenna; EM signal confining structures between neighboring concentric arrays; feed structures coupled to dual CP waveguide antenna elements to provide EM signals thereto; and co-orientation and design of dual CP waveguide antenna elements used in the array.

According to implementations of the present disclosure, there is provided an antenna for either or both transmitting and receiving an Orbital Angular Momentum (OAM) electromagnetic beam, the antenna comprising a plurality of concentric arrays. Each concentric array of the plurality of concentric arrays comprises: a respective aperture; and a respective plurality of dual circular-polarized waveguide antenna elements, each dual circular-polarized waveguide antenna element of the respective plurality of dual circular-polarized waveguide antenna elements comprising a top end and a bottom end for coupling to a feed structure. The antenna further comprises one or more concentric electromagnetic signal confining structures, wherein, each neighboring pair of concentric arrays of the plurality of concentric arrays have at least one electromagnetic signal confining structure of the one or more electromagnetic signal confining structures therebetween.

In implementations of the antenna, the respective bottom end of each dual circular-polarized waveguide antenna element comprises: a first rectangularly arranged port for either or both transmitting and receiving one or more right-hand circular polarized components of the OAM electromagnetic beam; a second rectangularly arranged port for either or both transmitting and receiving one or more left-hand circular polarized components of the OAM electromagnetic beam; and a partial wall separating the first and second rectangularly arranged ports.

In implementations of the antenna, all concentric arrays of the plurality of concentric arrays are coplanar.

In implementations of the antenna, a single central dual circular-polarized waveguide antenna element is positioned along a central axis of the antenna.

In implementations of the antenna, the plurality of concentric arrays comprises: a first concentric array comprising a first plurality of dual circular-polarized waveguide antenna elements; and a second concentric array surrounding the first concentric array, the second concentric array comprising a second plurality of dual circular-polarized waveguide antenna elements having double the dual circular-polarized waveguide antenna elements as compared to the first plurality of dual circular-polarized waveguide antenna elements; the antenna comprising a central frequency and the OAM electromagnetic beam comprising a wavelength at the central frequency; and each neighboring pair of dual circular-polarized waveguide antenna elements in each plurality of concentric arrays are spaced apart at a distance of about half the wavelength.

In implementations of the antenna, there is an outer concentric electromagnetic signal confining structure surrounding the second concentric array; and an inner concentric electromagnetic signal confining structure surrounding the single central dual circular-polarized waveguide antenna element; wherein the outer and inner concentric electromagnetic signal confining structures each comprise at least three decoupling rings.

In implementations of the antenna, there is a concentric electromagnetic signal confining structure comprising at least five decoupling rings between the first and second concentric arrays.

In implementations of the antenna, the first concentric array is configured to transmit, receive, or both transmit and receive a first component of the OAM electromagnetic beam comprising a non-zero order OAM mode having an absolute value of up to 16; and the second concentric array is configured to transmit, receive, or both transmit and receive a second component of the OAM electromagnetic beam comprising a non-zero order OAM mode having an absolute value of up to 32; and the single central dual circular-polarized waveguide antenna element is configured to transmit, receive, or both transmit and receive a third component of the OAM electromagnetic beam comprising a zero order OAM mode.

In implementations of the antenna, each concentric electromagnetic signal confining structure of the one or more concentric electromagnetic signal confining structures comprises: five or more decoupling rings, each decoupling ring of the five or more decoupling rings concentric with the plurality of concentric arrays and comprising a depth of about ¼ of a wavelength of the OAM electromagnetic beam at a central frequency of the antenna.

In implementations of the antenna, a diameter of the respective aperture of an outermost concentric array of the plurality of concentric arrays is about 40 times a wavelength of the OAM electromagnetic beam at a central frequency of the antenna.

In implementations, the antenna is configured to emit the OAM electromagnetic beam steerable at: an azimuth steering angle ranging from about 0° to about 360°; and an elevation steering angle ranging from about −42° to about 42° measured from a central axis of the plurality of concentric arrays to a central axis of a beam conical of the emitted OAM electromagnetic beam.

In implementations of the antenna, the respective aperture of each concentric array is sized such that a respective OAM beam component of the OAM electromagnetic beam, transmitted, received, or both transmitted and received by the respective concentric array has a same or similar cone angle.

In implementations, the antenna further comprised an outermost concentric electromagnetic signal confining structure surrounding an outermost concentric array of the plurality of concentric arrays.

In implementations, the antenna may combine features from two or more of the implementations described above as appropriate.

According to implementations of the present disclosure, there is provided a system comprising one or more feed structures. Each feed structure of the one or more feed structures comprising: at least one main board; at least one beam former; and at least one front-end module. The system further comprises an antenna for either or both transmitting and receiving an OAM electromagnetic beam, the antenna comprising a plurality of concentric arrays, each concentric array of the plurality of concentric arrays comprising: a respective aperture; and a respective plurality of dual circular-polarized waveguide antenna elements, each dual circular-polarized waveguide antenna element of the respective plurality of dual circular-polarized waveguide antenna elements comprising a top end and a bottom end coupled to one of the one or more feed structures; and one or more concentric electromagnetic signal confining structures, wherein, each neighboring pair of concentric arrays of the plurality of concentric arrays have at least one electromagnetic signal confining structure of the one or more electromagnetic signal confining structures therebetween.

In implementations of the system, each feed structure of the one or more feed structures is configured, in a transmit configuration, to: generate a plurality of respective OAM beam component signals; and provide each OAM beam component signal of the plurality of respective OAM beam component signals to at least one of the plurality of dual circular-polarized waveguide antenna elements of one of the plurality of concentric arrays, thereby causing the corresponding concentric array to emit a respective at least one OAM mode of the OAM electromagnetic beam directed according to provided beamsteering parameters.

In implementations of the system, each feed structure of the one or more feed structures comprises at least one microstrip to waveguide transition.

In implementations of the system, the at least one beam former of each feed structure of the one or more feed structures comprises one or more of a Butler matrix and a Rotman lens; and the at least one front-end module of each feed structure of the one or more feed structures comprises one or more variable phase shifters.

In implementations, the system may combine features from two or more of the implementations described above as appropriate.

According to implementations of the present disclosure, there is provided a method for generating and steering an Orbital Angular Momentum (OAM) electromagnetic beam, comprising the step of generating, by each feed structure of one or more feed structures, a respective plurality of OAM beam component signals by processing a plurality of input signals in accordance with beamsteering parameters and a respective at least one OAM mode of the OAM electromagnetic beam. The method further comprises the step of providing each respective plurality of OAM beam component signals to an OAM electromagnetic beam antenna comprising a plurality of concentric arrays, each concentric array of the plurality of concentric arrays comprising: a respective aperture; and a respective plurality of dual circular-polarized waveguide antenna elements, each dual circular-polarized waveguide antenna element of the respective plurality of dual circular-polarized waveguide antenna elements comprising a top end and a bottom end coupled to one of the one or more feed structures; and one or more concentric electromagnetic signal confining structures, wherein, each neighboring pair of concentric arrays of the plurality of concentric array have at least one electromagnetic signal confining structure of the one or more electromagnetic signal confining structures therebetween, wherein each respective plurality of OAM beam component signals is provided, via the one or more feed structures, to a corresponding concentric array of the plurality of concentric arrays. The method further comprises the step of emitting, by each corresponding concentric array of the plurality of concentric arrays, a respective OAM beam component of the OAM electromagnetic beam comprising the respective at least one OAM mode and directed according to the beam-steering parameters.

In implementations of the method, the OAM electromagnetic beam antenna further comprises a single central dual circular-polarized waveguide antenna element along a central axis of the thereof; and wherein emitting, by each corresponding concentric array of the plurality of concentric arrays, the respective OAM beam component of the OAM electromagnetic beam comprising the respective at least one OAM mode and directed according to the beamsteering parameters further comprises: emitting, by the single central dual circular-polarized waveguide antenna element, the respective OAM beam component comprising a zero order OAM mode of the OAM electromagnetic beam; and emitting, by each concentric array of the plurality of concentric arrays, the respective OAM beam component comprising the at least one non-zero order OAM mode of the OAM electromagnetic beam.

In implementations, the method, further comprises steering the emitted the OAM electromagnetic beam in accordance with the beamsteering parameters comprising: an azimuth steering angle ranging from about 0° to about 360°; and an elevation steering angle ranging from about −42° to about 42° measured from a central axis of the plurality of concentric arrays to a central axis of a beam conical of the emitted OAM electromagnetic beam.

In implementations, the method may combine steps from two or more of the implementations described above as appropriate.

Implementations have been described above in conjunction with aspects of the present disclosure upon which they can be implemented. Those skilled in the art will appreciate that implementations may be implemented in conjunction with the aspect with which they are described but may also be implemented with other implementations of that aspect. When implementations are mutually exclusive, or are incompatible with each other, it will be apparent to those skilled in the art. Some implementations may be described in relation to one aspect, but may also be applicable to other aspects, as will be apparent to those of skill in the art.

Other aspects and implementations of the disclosure are evident in view of the detailed description provided herein.

BRIEF DESCRIPTION OF THE FIGURES

Further advantages, permutations, and combinations of the invention will now appear from the above and from the following detailed description of the various particular implementations of the invention taken together with the accompanying drawings, each of which are intended to be non limiting, in which.

DETAILED DESCRIPTION

Figure 1:
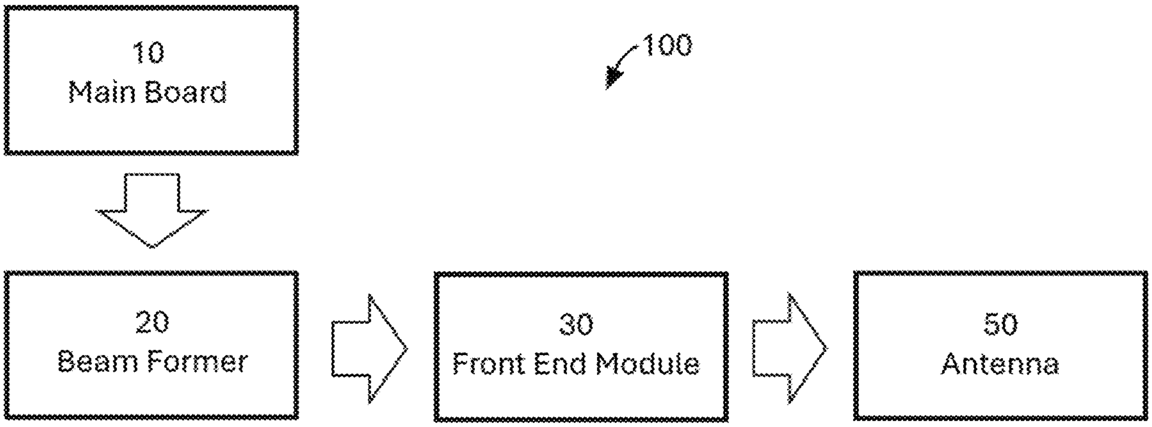
FIG. 1 is a high-level systematic block diagram of an orbital angular momentum (OAM) beam steering antenna system according to an implementation of the present disclosure.

Unless defined otherwise, all technical and scientific terms used herein have the same meaning as commonly understood by one of ordinary skill in the art to which the disclosure pertains. Although any materials and any steps similar to or equivalent to those described herein can be used in the practice of the present disclosure, exemplary suitable materials and steps are described below.

The present disclosure sets forth various implementations via the use of block diagrams, flowcharts, and exemplary structures. Insofar as such block diagrams, flowcharts, and exemplary structures contain one or more functions and/or operations, it will be understood by a person skilled in the art that each function and/or operation within such block diagrams, flowcharts, and exemplary structures can be implemented, individually or collectively, by a wide range of hardware, software, firmware, or combination thereof.

Implementations of the present disclosure pertain to apparatuses, systems, and methods for generation and electronic beamsteering of an OAM beam carrying one or more dual circular polarized OAM modes. A beamsteering antenna (and systems and methods using the same) disclosed herein are applicable, for example, to wireless (e.g. mobile) communication and are operable via adjusting respective phases and amplitudes of feeding probes of a concentric array (for example, a UCA) comprising dual circular-polarized (CP) waveguide antenna elements to cooperatively emit OAM beam components each carrying an associated one or more OAM modes, each OAM mode comprising a right-hand circular polarization (RHCP) signal and a left hand circular polarization (LHCP) signal. The emitted OAM beam can include individual OAM beam components emitted by each of a plurality of concentric arrays of an OAM beam steering antenna. According to implementations disclosed herein, the emitted OAM beam can be steered in a specific direction, enabling, at least in part, enhanced coverage and improved signal quality, for example are operable, at least in part, to dynamically track and correspondingly adjust the direction of the emitted OAM beam to follow a moving target, such as a user or a base station, for example.

The dual CP waveguide antenna elements used in the antennas, systems, and methods disclosed herein may advantageously enable simultaneously transmitting and/or receiving signals in at least two distinct circular polarization phases, thereby resulting in increased capacity and allowing for miniaturization of the OAM beam steering antenna. Antenna miniaturization can increase steering range, reduce side lobes/grating lobes, and increase antenna efficiency.

Advantageously, the present disclosure may provide antennas, systems, and methods with improved beam steering capabilities (both elevation steering and azimuth steering).

The term "elevation steering" or the like, as used throughout this disclosure, refers to an angle measured from a central axis of one or more UCAs of an OAM beam steering antenna to a central axis of a beam conical of the emitted OAM EM beam.

The term "azimuth steering" or the like, as used throughout this disclosure, refers to angle around the central axis of an OAM beam steering antenna.

For example, advantageously, in implementations, the antennas, systems, and methods disclosed herein allow transmitting/receiving multiple steerable OAM mode at an azimuth steering angle ranging from about 0° to about 360° and an elevation steering angle ranging from about −42° to about 42°.

Advantageously, the present disclosure may provide antennas, systems, and methods capable of producing an OAM beam with desirable radiation characteristics (i.e. high directivity with low sidelobe activity). For example, advantageously, in implementations, the antennas, systems, and methods disclosed herein may achieve OAM beam directivity in some frequency ranges of about 20 dBi or more.

Reference will now be made in detail to exemplary implementations of the disclosure, wherein numerals refer to like components, examples of which are illustrated in the accompanying drawings that further show exemplary implementations, without limitation.

FIG. 1 is a high-level systematic block diagram of an OAM beam steering antenna system 100 according to an implementation of the present disclosure.

In an implementation, OAM beam steering antenna system 100 comprises a main board 10, a beam former 20, a front-end module 30, and an OAM beam steering antenna 50. In general, the main board 10, beam former 20, and front-end module 30 are collectively referred to as a feed structure. In implementations, a feed structure may comprise one or more of each of a main board 10, a beam former 20, and a front-end module 30.

In an implementation, the main board 10 processes a baseband signal to a signal in a desired frequency. For example, the main board 10 may processes a baseband signal to a millimeter wave frequency band signal. In an implementation, the main board 10 may processes a baseband signal to a signal anywhere between from about 0 Hz (DC) to about 100 GHz (DC). In an implementation, the main board 10 may comprise one or more up-converter chains for increasing the frequency of an input signal.

In an implementation, beam former 20 converts the signal output from main board 10 into a signal comprising one or more OAM modes. In an implementation, beam former 20 may general a signal comprising a zero order OAM mode and at least one non-zero order OAM mode. For example, non-zero order OAM modes may be −32, −16, −8, −4, −2, 0, +2, +4, +8, +16, and +32, although a greater number of OAM modes is contemplated in other implementations. As discussed in greater detail below, the number of OAM modes capable of being transmitted and/or received by OAM beam steering antenna system 100 depends on the structural characteristics of OAM beam steering antenna 50. In an implementation, beam former 20 is a Rotman lens. In an implementation, beam former 20 is a Butler matrix.

In an implementation, front-end module 30 converts the signal output from beam former 20 into a signal comprising a steering phase. In an implementation, the steering phase comprises an elevation angle. In an implementation, the steering phase comprises an azimuth angle. In an implementation, the steering phase comprises both an elevation angle and an azimuth angle. In an implementation, front-end module 30 is a variable phase shifter. OAM beam components generated by feed structures are steerable in accordance with beamsteering parameters.

In an implementation, the signal generated by front-end module 30 is directed to OAM beam steering antenna 50. Accordingly, OAM beam steering antenna 50 is coupled to the feed structure.

In implementations, OAM beam steering antenna 50 is capable of transmitting an OAM beam, comprising a zero order OAM mode and at least one non-zero order OAM mode. As described in greater detail below, OAM beam steering antenna 50 comprises a plurality of concentric arrays. For example, concentric arrays may be Uniform Circular Arrays (UCAs), each UCA comprising a plurality of circularly arranged dual circular-polarized waveguide antenna elements. In implementations, concentric arrays may not be perfectly circular or perfectly uniform.

In implementations, each dual circular-polarized waveguide antenna element of OAM beam steering antenna 50 is coupled to a feeding structure by way of a microstrip to waveguide transition. In implementations, a feeding waveguide may be used to facilitate coupling of each dual circular-polarized waveguide antenna element to a feeding structure.

In implementations, each concentric array (for example, a UCA) of the plurality of concentric arrays of OAM beam steering antenna 50 is configured to transmit, receive, or both transmit and receive a respective OAM beam component having or carrying at least one circular polarized OAM mode of the OAM electromagnetic beam.

The OAM modes of the OAM beam emitted by OAM beam steering antenna 50 have respective spatial field distributions of EM energy represented by corresponding rotational OAM mode numbers (l). For example, OAM beam steering antenna 50 may comprise a single central dual CP waveguide antenna element configured to transmit, receive or both transmit and receive the respective OAM beam component having or carrying a zero order (i.e. rotational OAM mode number (=O) OAM mode of the OAM electromagnetic beam.

Each UCA of the plurality of concentric UCAs surrounding the single central dual CP waveguide antenna element can be configured to transmit, receive or both transmit and receive the respective OAM beam component having or carrying at least one non-zero order OAM mode of an associated conjugate pair of non-zero order OAM modes (i.e. respective rotational OAM mode number $l=\pm p$, where p is a non-zero integer) of the OAM electromagnetic beam. As readily understood by a person skilled in the art, higher order OAM modes (i.e. higher absolute value of the rotational mode number, $|l|$) have larger corresponding cone angles if transmitted by a same antenna. In order to facilitate substantially same cone angles of all OAM beam components emitted by UCAs, OAM beam components carrying higher order mode(s) are associated with and emitted by UCAs having larger respective UCA diameters (e.g. UCA apertures). The UCA diameter (e.g. aperture) size and respective at least one OAM mode (i.e. +l, −l, or both) can be chosen for each UCA such that respective OAM beam components emitted by UCAs have approximately the same cone angles. Thereby, the directionality of the emitted OAM beam may be improved facilitating its convergence at a single location (e.g. receiver location).

In implementations, each UCA is configured, in a transmit configuration, to emit a respective OAM beam component of the (emitted) OAM beam. The OAM beam emitted by the OAM beam steering antenna 50 includes each respective OAM beam component of the plurality of UCAs of the OAM beam steering antenna 50. The OAM beam emitted by the OAM beam steering antenna 50 is spatially multiplexed using apparatuses and methods to carry multiple OAM modes.

In implementations, the OAM modes carried by the OAM beam emitted by OAM beam steering antenna 50 are considered as being in the far-field region of the transmitted EM field.

In implementations, the OAM beam steering antenna 50 is operable at a predetermined or preset electromagnetic wavelength and frequency. The term “electromagnetic” is intended to refer herein to radiation in any appropriate region of the electromagnetic spectrum. In some implementations, the OAM beam may have a wavelength ranging from about 0.3 mm to about 300 mm (corresponding to a frequency ranging from about 1 GHz to 1 THz), although other implementations may operate within other wavelength ranges.

Figure 2:
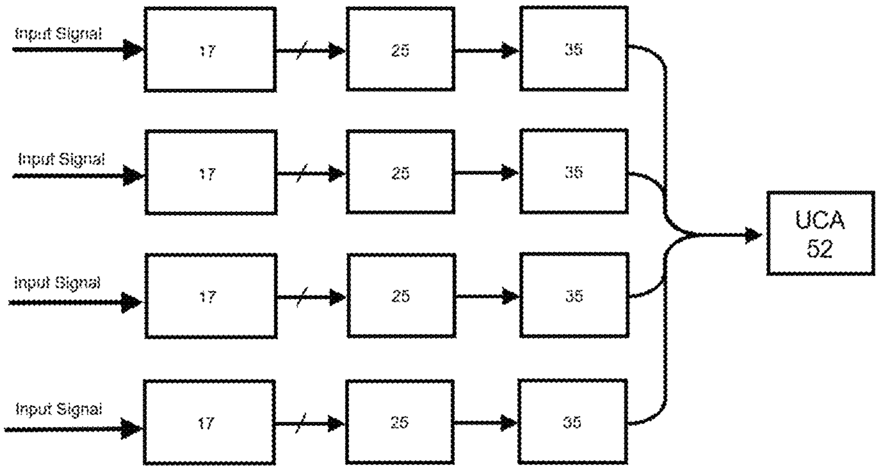
FIG. 2 is a systematic block diagram of a feeding network for a UCA comprising 64 dual circular-polarized (CP) waveguide antenna elements according to an implementation of the present disclosure

FIG. 2 is a systematic block diagram of a feeding network for a UCA 52 comprising 64 dual CP waveguide antenna elements according to an implementation of the present disclosure. The feeding network shown in FIG. 2 may comprise part of one or more feeding structures for the 64 dual CP waveguide antenna elements of UCA 52.

In an implementation, UCA 52 may be one of a plurality of UCAs forming part of OAM beam steering antenna 50. In an implementation, UCA 52 may be an innermost UCA of OAM beam steering antenna 50. In an implementation, UCA 52 may surround a single central dual CP waveguide antenna element along a central axis of OAM beam steering antenna 50.

In implementations, the feeding network shown in FIG. 2 forms part of a feeding structure for UCA 52. As shown in FIG. 2, a plurality of signals designated to become OAM modes enter the feeding network, for example, each "Input Signal" in FIG. 2 may transformed to an OAM mode such as OAM modes −4, −2, +2, and +4, respectively. In implementations, a feed structure is configured, in a transmit configuration, to receive a plurality of input signals designated to become different OAM modes.

The feed network shown in FIG. 2 may comprise one or more main boards comprising a plurality of 4-way power splitters 17, each 4-way power splitter 17 for splitting one of the input signals designated for a given OAM mode (for example, −4, −2, +2, and +4) into four sub-signals. The four split signals for each designated OAM mode may then be directed to a 16-port feed board comprising a Rotman lens 25, or other suitable beam former 20.

For example, the first split input signal designated as −4 OAM mode may be directed to a first group of four ports in a 16-port feed board comprising a Rotman lens 25, the second split input signal designated as −4 OAM mode may be directed to a second group of four ports in a 16-port feed board comprising a Rotman lens 25, the third split input signal designated as −4 OAM mode may be directed to a third group of four ports in a 16-port feed board comprising a Rotman lens 25, and the fourth split input signal designated as −4 OAM mode may be directed to a fourth group of four ports in a 16-port feed board comprising a Rotman lens 25. Likewise, the 4-way split input signals designated as OAM modes −2, +2, and +4 may each be directed into a 16-port feed board comprising a Rotman lens 25. Accordingly, feed network shown in FIG. 2 comprises a four 16-port feed board comprising a Rotman lens 25, one 16-port feed board comprising a Rotman lens 25 for each OAM mode (−4, −2, +2, and +4).

Rotman lenses 25 then process the split input signals to possess their designated OAM modes. In other words, each of the four 16-port feed boards comprising a Rotman lens 25 may process the input signals in accordance with beamforming parameters. Next, the beamformed signals (for each of OAM modes −4, −2, +2, and +4) are directed to a 16-channel front-end module (FEM) board 35. Each port in each 16-port feed board comprising a Rotman lens 25 is coupled to a channel in one of the 16-channel FEM boards 35. Accordingly, the feed network shown in FIG. 2 comprises four 16-channel FEM boards 35.

Each 16-channel FEM board 35 may process the input OAM signals in accordance with defined beamsteering parameters. In implementations, each 16-channel FEM board 35 comprises a variable phase shifter. For example, each 16-channel FEM board 35 may perform (e.g. electronically) controllable gain and phase adjustments on the OAM signal input therein, thereby adding a steering phase to each OAM signal.

In implementations, each channel of each one of the four 16-channel FEM boards 35 is coupled to a respective bottom end of one of the 64 dual CP waveguide antenna elements of UCA 52. In implementations, UCA 52 is configured, in a transmit configuration, to transmit a component of an OAM beam comprising one or more OAM modes. In implementations, each OAM mode of the one or more OAM modes of a respective OAM beam component emitted by UCA 52 comprises dual circular polarization properties.

In implementations, the feed network shown in FIG. 2 is configured to receive or transmit and receive a component of an OAM beam comprising one or more OAM modes.

Figure 3:
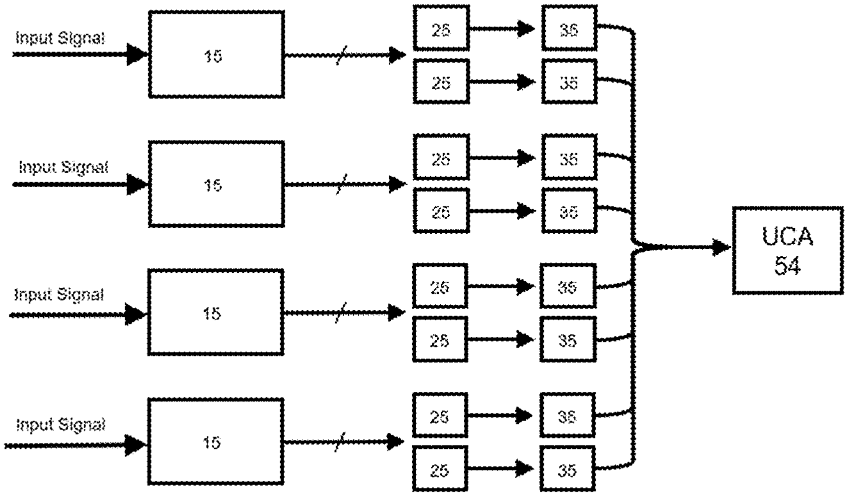
FIG. 3 is a systematic block diagram of a feeding network for a UCA comprising 128 dual CP waveguide antenna elements according to an implementation of the present disclosure

FIG. 3 is a systematic block diagram of a feeding network for UCA 54 comprising 128 dual CP waveguide antenna elements according to an implementation of the present disclosure.

In an implementation, UCA 54 may be one of a plurality of UCAs forming part of OAM beam steering antenna 50. In an implementation, UCA 54 may be an outermostmost UCA of OAM beam steering antenna 50.

In implementations, the feeding network shown in FIG. 3 forms part of a feeding structure for UCA 54. As shown in FIG. 3, a plurality of signals designated to become OAM modes enter the feeding network, for example, each "Input Signal" in FIG. 3 may be designated to become OAM modes −4, −2, +2, and +4. In implementations, a feed structure is configured, in a transmit configuration, to receive a plurality of input signals designated to become different OAM modes.

The feed network shown in FIG. 3 may comprise a plurality of 8-way power splitters 15, each 8-way power splitter 15 for splitting one of the designated OAM modes (−4, −2, +2, and +4) into eight sub-signals. The eight split signals for each designated OAM mode may then be directed to a 16-port feed board comprising a Rotman lens 25.

For example, the first split input signal designated as −4 OAM mode may be directed to a first group of four ports in a first 16-port feed board comprising a Rotman lens 25, the second split input signal designated as −4 OAM mode may be directed to a second group of four ports in a first 16-port feed board comprising a Rotman lens 25, the third split input signal designated as −4 OAM mode may be directed to a third group of four ports in a first 16-port feed board comprising a Rotman lens 25, the fourth split input signal designated as −4 OAM mode may be directed to a fourth group of four ports in a first 16-port feed board comprising a Rotman lens 25, the fifth split input signal designated as −4 OAM mode may be directed to a first group of four ports in a second 16-port feed board comprising a Rotman lens 25, the sixth split input signal designated as −4 OAM mode may be directed to a second group of four ports in a second 16-port feed board comprising a Rotman lens 25, the seventh split input signal designated as −4 OAM mode may be directed to a third group of four ports in a second 16-port feed board comprising a Rotman lens 25, and the eighth split input signal designated as −4 OAM mode may be directed to a fourth group of four ports in a second 16-port feed board comprising a Rotman lens 25. Likewise, the 4-way split input signal designated as OAM modes −2, +2, and +4 may each be directed into two 16-port feed boards comprising a Rotman lens 25. Accordingly, feed network shown in FIG. 3 comprises eight 16-port feed board comprising a Rotman lens 25, two 16-port feed board comprising a Rotman lens 25 for each OAM mode (−4, −2, +2, and +4).

Rotman lenses 25 then process the split input signals to possess their designated OAM modes. In other words, each of the eight 16-port feed boards comprising a Rotman lens 25 may process the input signals in accordance with beamforming parameters. Next, the beamformed signals (for each of OAM modes −4, −2, +2, and +4) are directed to a 16-channel FEM board 35. Each port in each 16-port feed board comprising a Rotman lens 25 is coupled to a channel in one of the 16-channel FEM boards 35. Accordingly, the feed network shown in FIG. 3 comprises eight 16-channel FEM boards 35.

Each 16-channel FEM board 35 may process the input signals in accordance with defined beamsteering parameters. In implementations, each 16-channel FEM board 35 comprises a variable phase shifter. For example, each 16-channel FEM board 35 may perform (e.g. electronically) controllable gain and phase adjustments on the signal input therein, thereby adding a steering phase to each OAM signal.

In implementations, each channel of each one of the eight 16-channel FEM boards 35 is coupled to a respective bottom end of one of the 128 dual CP waveguide antenna elements of UCA 54. In implementations, UCA 54 is configured, in a transmit configuration, to transmit a component of an OAM beam comprising one or more OAM modes. In implementations, each OAM mode of the one or more OAM modes of a respective OAM beam component emitted by UCA 54 comprises dual circular polarization properties.

In implementations, the feed network shown in FIG. 3 is configured to receive or transmit and receive a component of an OAM beam comprising one or more OAM modes.

Figure 4:
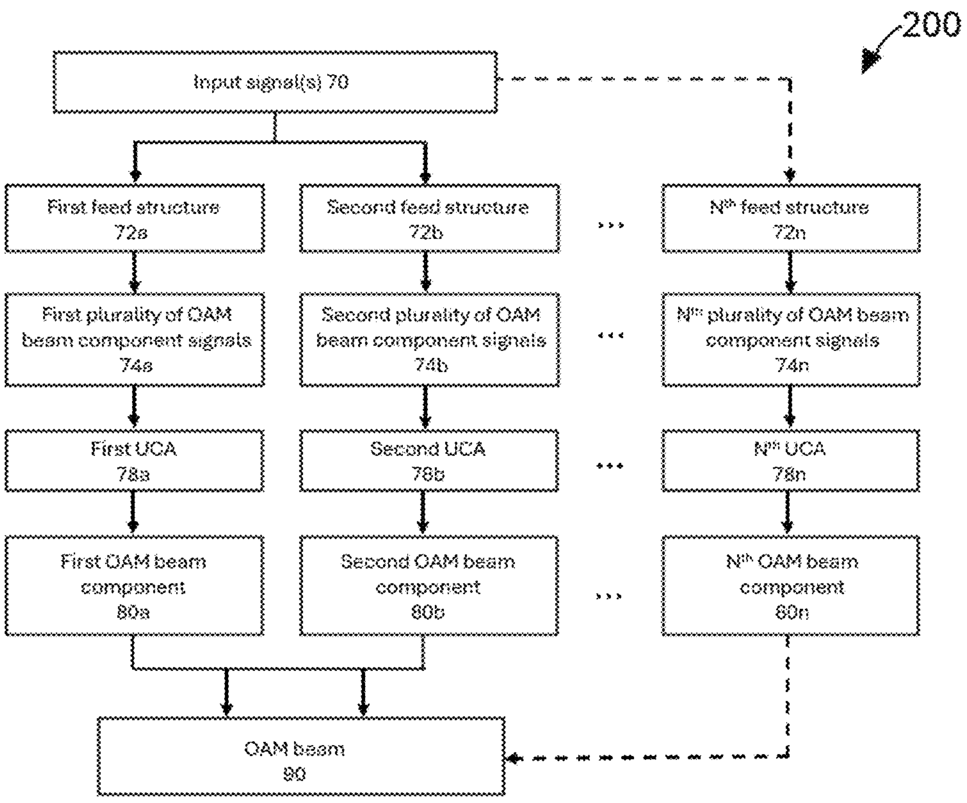
FIG. 4 is a flow chart of a method of operating an OAM beam steering antenna according to an implementation of the present disclosure.

FIG. 4 is a flow chart of a method 200 of operating an OAM beam steering antenna according to an implementation of the present disclosure. Method 200 involves generating and steering from an OAM beam steering antenna comprising at least two concentric arrays (for example, UCAs). Optionally, OAM beam steering antenna any additional number of UCAs. Optional inclusion of additional UCAs is illustrated in FIG. 4 with dashed arrows and the ellipsis (three dots) character.

The method 200 includes providing one or more input signals 70 to a plurality of feed structures, including a first feed structure 72*a* and a second feed structure 72*b*. As shown in FIG. 4, the method 200 may involve providing one more input signals 70 to a plurality of additional feed structures, indicated by 72*n*. For example, additional feed structures 72*n* may include a third feed structure or ten or more feed structures.

The feed structures 72*a*, 72*b*, and 72*n* receive the input signal(s) 70 and are configured to process the input signal(s) 70 to generate or output a plurality of OAM beam component signals (74*a*, 74*b*, and 74*n* respectively) in accordance with at least one OAM mode and beamsteering parameters.

In an implementation, the plurality of OAM beam component signals 74*a*, 74*b*, and 74*n* is provided to a respective plurality of dual CP waveguide antenna elements of a UCA associated with each feed structure. For example, a first plurality of OAM beam component signals 74*a* is provided to a first UCA 78*a* and a second plurality of OAM beam component signals 74*b* is provided to a second UCA 78*b*. Any number of additional plurality of OAM beam component signals 74*n* may optionally be provided to any number of additional UCAs 78*n*. For example, a third plurality of OAM beam component signals may be provided to a third UCA. Additionally, a fourth plurality of OAM beam component signals may be provided to a fourth UCA. Method 200 may involve providing ten or more pluralities of OAM beam component signals to ten or more respective UCAs.

In an implementation, first UCA 78*a* may comprise 64 circularly arranged dual CP waveguide antenna elements, and may, for example, be UCA 52 (described in greater detail below in relation to FIGS. 6A and 6B). In an implementation, second UCA 78*b* may comprise 128 circularly arranged dual CP waveguide antenna elements, and may, for example, be UCA 54 (described in greater detail below in relation to FIGS. 6A and 6B).

In method 200, UCAs 78*a*, 78*b*, and 78*n* receive the OAM beam component signals 74*a*, 74*b*, and 74*n*, respectively, at respective dual CP waveguide antenna elements thereof and emit, via their respective plurality of dual CP waveguide antenna elements a respective OAM beam component 80*a*, 80*b*, and 80*n*, each of which comprise RHCP and LHCP properties. For example, first UCA 78*a* emits a first OAM beam component 80*a* and second UCA 78*b* emits a second OAM beam component 80*b*. Any number of additional UCAs 78*n* may emit a respective additional OAM beam component 80*n*. For example, a third UCA may emit a third OAM beam component. In implementations, a fourth UCA may emit a fourth OAM beam component. In implementations, ten or more UCAs may emit a respective ten or more OAM beam components.

The OAM beam components 80*a*, 80*b*, and 80*n* emitted by UCA 78*a*, 78*b*, and 78*n*, respectively, each have at least one circularly polarized OAM mode associated thereto, and is steered (e.g. directed in a particular direction or to a particular location with respect to a central axis of the OAM antenna) as predetermined or preset by beamsteering parameters.

In a transmit configuration, OAM beam components 80*a*, 80*b*, and 80*n* combine to form OAM beam 90, which is transmitted by OAM beam steering antenna. In a receiving configuration, OAM beam 90 is received by OAM beam steering antenna and processed into OAM beam components 80*a*, 80*b*, and 80*n*.

In implementations, first feed structure 72*a*, second feed structure 72*b*, and any optionally additional feed structures 72*n* are configured to process the plurality of input signals (i.e. signal(s) received thereby or input thereto) by setting each of the plurality of input signals to have a respective one or more of: a phase (i.e. phase shift), an amplitude, a gain, a delay, and combinations thereof, in accordance with one or more OAM modes associated with the respective feed structure and a corresponding UCA coupled to the feed structure. Such processed (e.g. beamformed) signals output by the feed structure are provided to the corresponding UCA and, by superposition, cause the corresponding UCA to emit a respective OAM beam component having the one or more OAM modes. The feed structures 72*a*, 72*b*, and 72*n* may include a suitable device or component implementable using a printed circuit board (PCB), for example, as readily understood by a person skilled in the art, for processing input signals in accordance with the one or more OAM modes associated with the respective feed structure. Non-limiting examples of such suitable device or component include: a Butler matrix and a Rotman lens.

Notably, signal processing in accordance with beamsteering parameters is, at least in part, a function of the number of waveguide antenna elements of the corresponding UCA and is, therefore, specifically tailored for each respective feed structure and its corresponding UCA. Such suitable device or components adding a steering phase to an OAM mode signal may include a front-end module having a plurality of variable phase shifters and gain adjusters, for example.

More generally, each feed structure 72*a*, 72*b*, and 72*n* may be configured to provide suitable OAM beam component signals at suitable dual CP waveguide antenna elements such that, when combined according to a superposition, cause transmission of one or more OAM beams steered in a desired and controllably adjustable direction. Generating the signals so as to perform a desired beamforming (to create OAM signals) and to perform a desired beamsteering (to steer the OAM signals) can be performed separately or together.

In implementations, each feed structure 72*a*, 72*b*, and 72*n* is coupled to the bottom ends of a plurality of circularly arranged dual CP waveguide antenna elements of a respective UCA via a plurality of microstrip to waveguide transitions.

In implementations, feed structures 72*a*, 72*b*, and 72*n* may include suitable signal splitters or dividers in order to output a quantity of processed signals (i.e. processed in accordance with the one or more OAM modes and the beamsteering parameters) corresponding to a quantity of dual CP waveguide antenna elements of the corresponding UCA.

In implementations, the respective OAM beam components (80*a*, 80*b*, and 80*n*) emitted by UCAs (78*a*, 78*b*, and 78*n*) of the OAM antenna converge at a same (i.e. 3-dimensional) receiver location configured to receive the OAM beam comprising the respective OAM beam components.

In implementations, each feed structure (72*a*, 72*b*, and 72*n*) includes a plurality of ports including one (unique) port for every group of dual CP waveguide antenna elements of a respective UCA corresponding to or associated with the feed structure. In implementations, each port may be configured to provide a respective phase of the OAM beam component signal. In implementations, the group of dual CP waveguide antenna elements fed by a given feed structure may be less than the total number of dual CP waveguide antenna elements in a given UCA. Accordingly, in implementations, a given UCA may be associated with more than one feed structure. In implementations, each dual CP waveguide antenna element may be associated with its own respective feed structure. In implementations, the feed structure associated with separate dual CP waveguide antenna elements may share structural components, for example, sharing a common main board.

In implementations, feed structures (72*a*, 72*b*, and 72*n*) may each comprise a plurality feed structures for feeding a portion of the dual CP waveguide antenna elements forming part of a given UCA.

In implementations, each UCA (eg. 78*a*, 78*b*, and 78*n*) of the plurality of UCAs may have a corresponding feed structure configured to operate in a transmit configuration and coupled to the bottom ends of each dual CP waveguide antenna element of the UCA via respective microstrip to waveguide transition. The feed structure is configured to generate and provide a respective OAM beam component signal of the plurality of respective OAM beam component signals to a different group of dual CP waveguide antenna elements of the UCA. The respective OAM beam component signals are provided to respective bottom ends of dual CP waveguide antenna elements of the UCA. Therefore, in such implementations, there is a one to one correlation between an OAM beam component signal and the particular group of dual CP waveguide antenna elements serviced by the given feed structure. For example, for a given UCA having a respective plurality of dual CP waveguide antenna elements, a given feed structure can be configured to split a plurality of OAM beam component signals into two channels or ports, each channel or port responsible for feeding one of the two groups of dual CP waveguide antenna elements forming part of the UCA.

Figure 5A:
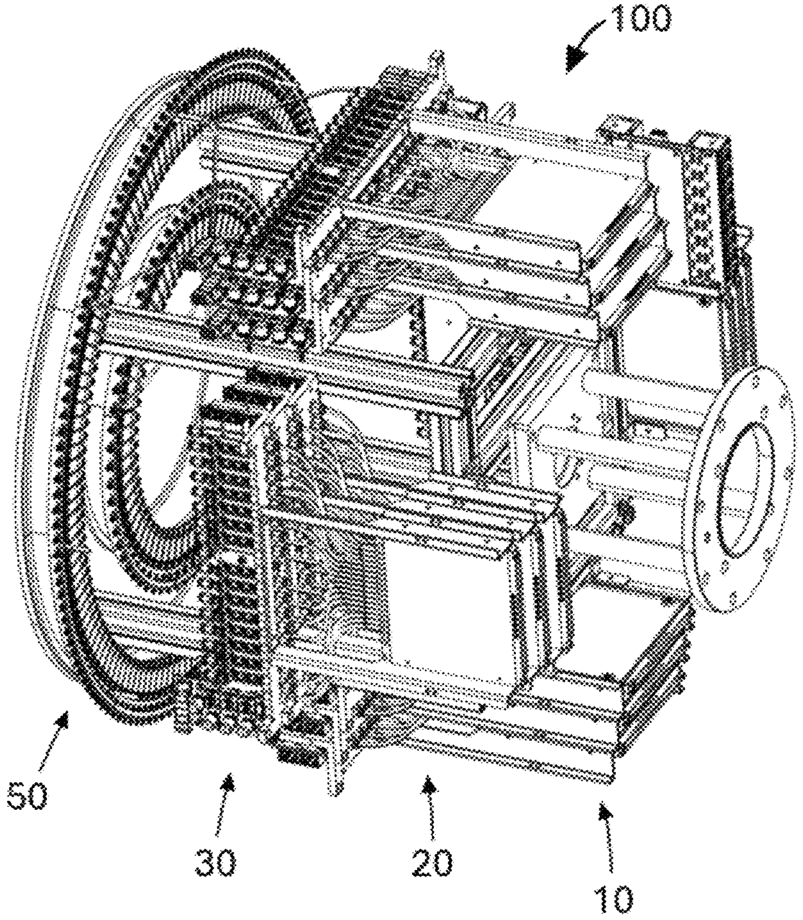
FIG. 5A is a perspective view of an OAM beam steering antenna system according to an implementation of the present disclosure.
Figure 5B:
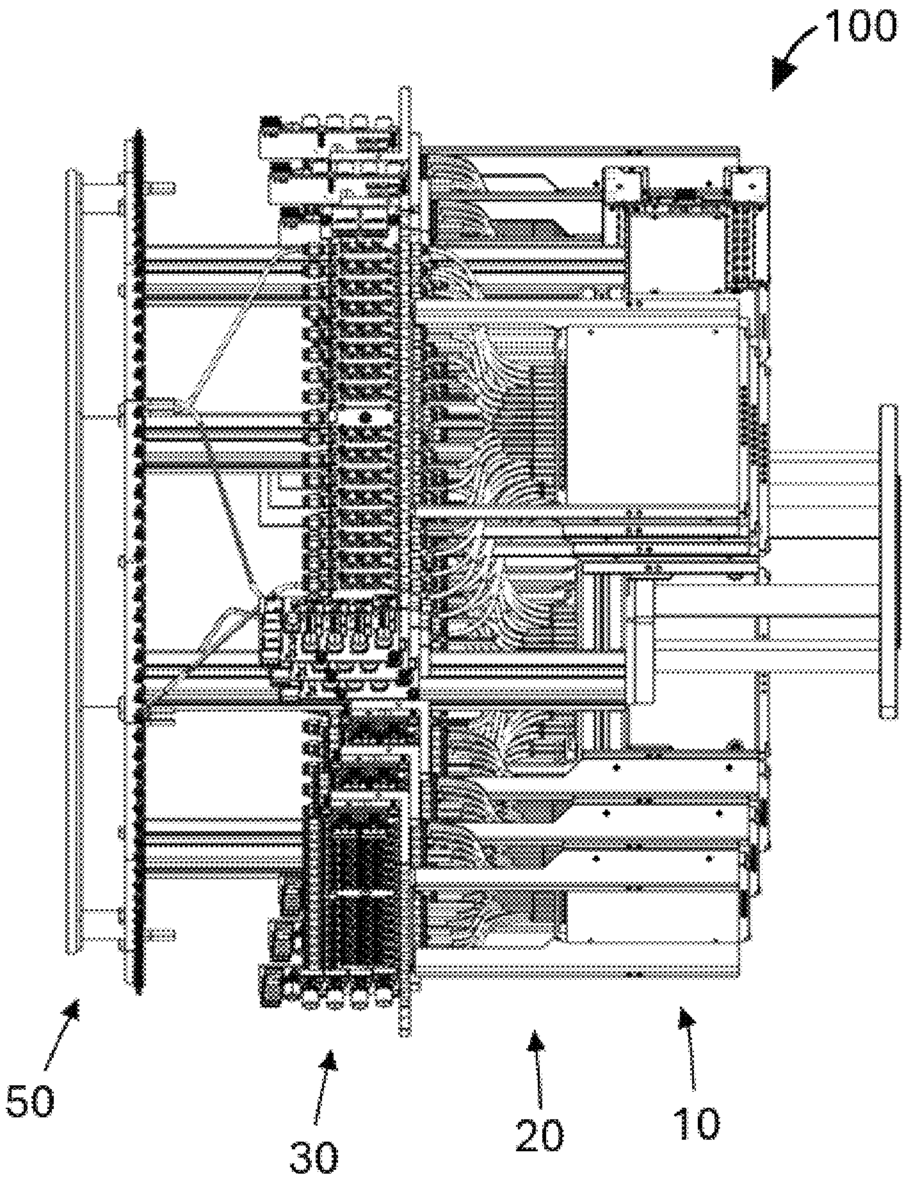
FIG. 5B is a side view of an OAM beam steering antenna system according to an implementation of the present disclosure.

FIG. 5A is a perspective view and FIG. 5B is a side view of an OAM beam steering antenna system 100 according to an implementation of the present disclosure.

The OAM beam steering antenna system 100 shown in FIG. 5A and FIG. 5B may be an exemplary system of the OAM beam steering antenna system 100 shown in FIG. 1.

The OAM beam steering antenna system 100 shown in FIG. 5A and FIG. 5B comprises a plurality of main boards 10, a plurality of beam formers 20, and a plurality of front-end modules 30 (collectively referred to as a feed structure) which may have the same functions as described above in relation to FIG. 1. The OAM beam steering antenna system 100 also comprises an OAM beam steering antenna 50 comprising a plurality of concentric arrays (for example, UCAs), each concentric array comprising a plurality of circularly-arranged dual CP waveguide antenna elements.

In e implementations, OAM beam steering antenna system 100 comprises a plurality of OAM feed structures, each feed structure for servicing one of the plurality of UCAs of the OAM beam steering antenna 50. In implementations, each feed structure of OAM beam steering antenna system 100 is coupled to the bottom end of a respective dual CP waveguide antenna elements.

As shown in FIG. 5A and FIG. 5B, the feed structure is located below OAM beam steering antenna 50. In implementations, electromagnetic energy of different phases and amplitudes can be provided to each of the one or more feed structures to facilitate beamforming. The electromagnetic energy is received, combined (e.g. according to a Rotman lens operation) and redirected into the dual CP waveguide antenna elements of OAM beam steering antenna 50.

The skilled person in the art related to the present disclosure is familiar antenna feed structures and has the requisite skill to construct an appropriate feed structure for the systems, antennas, and methods disclosed herein. The skilled person has the requisite knowledge on how to design one or more feed structures for receiving and/or transmitting a multi-mode OAM beam.

Figure 6A:
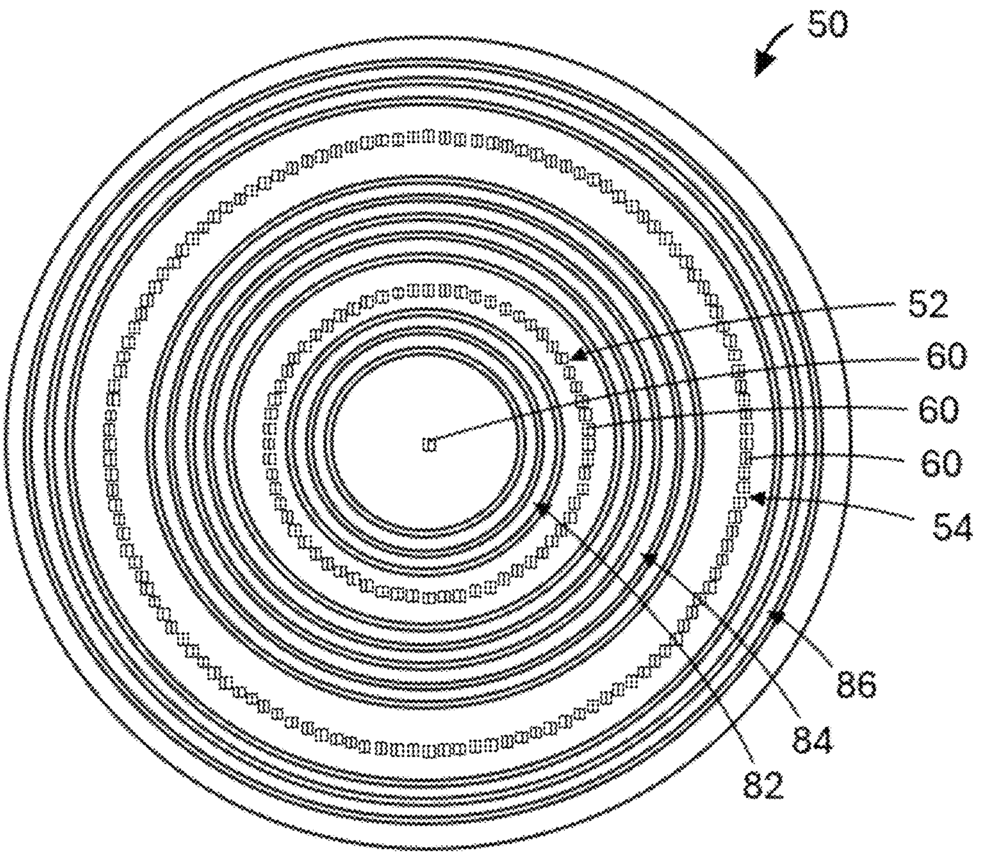
FIG. 6A is a top view of an OAM beam steering antenna according to an implementation of the present disclosure.
Figure 6B:
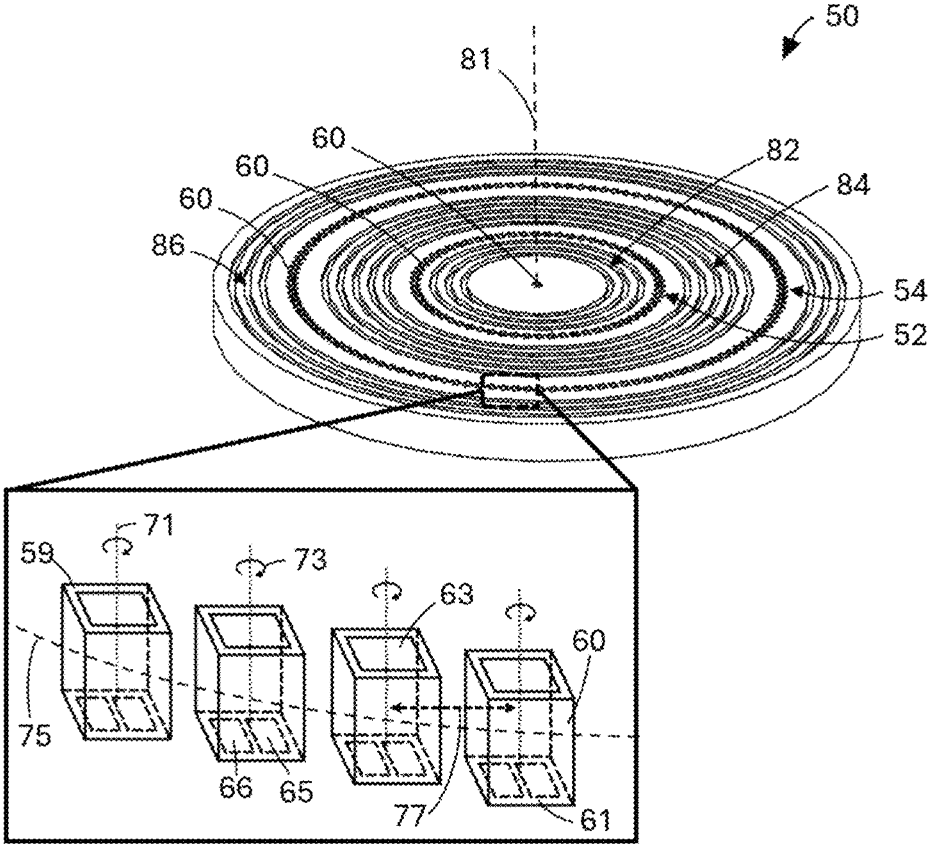
FIG. 6B is a perspective view of an OAM beam steering antenna according to an implementation of the present disclosure including a zoomed in portion of dual CP waveguide antenna elements forming part of a UCA of the OAM beam steering antenna.

FIG. 6A is a top view of an OAM beam steering antenna 50 according to an implementation of the present disclosure and FIG. 6B is a perspective view of an OAM beam steering antenna 50 according to an implementation of the present disclosure including a zoomed in portion of dual CP waveguide antenna elements 60 forming part of a second UCA 54 of the OAM beam steering antenna 50.

As schematically illustrated in FIG. 6A, an implementation of an OAM beam steering antenna 50 includes at least two concentric UCAs, for example, a first UCA 52 and a second UCA 54 surrounding the first UCA 52. As shown in FIG. 6B, first UCA 52 and second UCA 54 share the same central axis 81 of OAM beam steering antenna 50.

First UCA 52 has a diameter representative of an aperture and includes a plurality of circularly-arranged dual CP waveguide antenna elements 60. Second UCA 54 has a diameter representative of a different aperture and includes a different plurality of circularly-arranged dual CP waveguide antenna elements 60. The OAM beam steering antenna 50 may include additional UCAs each having a respective UCA diameter (representative of an aperture) and including a respective plurality of circularly-arranged dual CP waveguide antenna elements 60.

In an implementation, the aperture of a given UCA corresponds to a surface (eg. top surface 106) on the OAM beam steering antenna 50 which is generally perpendicular to the direction in which one or more component(s) of an OAM electromagnetic beam is transmitted or received by a given UCA. In an implementation, the respective diameter of the first UCA 52 and second UCA 54 pass through the same central location on OAM beam steering antenna 50 represented by central axis 81.

In an implementation, an aperture of a given UCA may be represented by a respective diameter for the UCA. In an implementation, an aperture of a given UCA may be represented by a disk having a circular, or substantially circular, perimeter (i.e. circumference) that passes through the center of each dual CP waveguide antenna element 60 of the UCA. In other implementations, such circumference may, for example, coincide with inner or outer edges of dual CP waveguide antenna element 60 of a given UCA.

In an implementation, the respective apertures of first UCA 52 and second UCA 54 are substantially co-planar. In implementations, co-planar UCAs may advantageously enable optimal OAM beam convergence between OAM beam components of multiple UCAs and allow for a and wide range of beam steering.

In an implementation, OAM beam steering antenna 50 comprises more than two UCAs, for example, a third UCA, a fourth UCA, a fifth UCA, or ten or more UCAs. In an implementation, OAM beam steering antenna 50 comprises twenty UCAs. In an implementation, OAM beam steering antenna 50 comprises fifty UCAs. In an implementation, all the UCAs of OAM beam steering antenna 50 comprise a respective aperture each of which is co-planar with one another.

In implementations, the relationship between the diameter size (representative of an aperture) of a given UCA and the number of dual CP waveguide antenna elements 60 in the UCA may be calculated using Equation (1):

$$2R=(\lambda/2)\times(N/\pi) \tag{1}$$

where R is the UCA radius (i.e. ½ of the aperture or UCA's diameter which may be representative of the UCA's aperture), λ is the OAM EM beam wavelength, and N is the number or quantity of dual CP waveguide antenna elements 60 in the UCA. Equation (1) may be approximate, with N in practice rounded to the nearest power of two.

According to Equation (1), an antenna with a UCA having a diameter of 40 wavelengths will have 256 dual CP waveguide antenna elements 60. Similarly, an antenna with a UCAs having diameters of 20, 10 and 5 wavelengths will have 128, 64 and 32 dual CP waveguide antenna elements 60, respectively. A certain aperture size may be desired for reasons such as transmit power, or to provide for a certain transmit cone angle (for example to match with cone angles of other groups of dual CP waveguide antenna elements 60 which transmit different OAM modes). However, larger aperture sizes require more dual CP waveguide antenna elements 60 and thus more complexity.

In implementations, Equation (1), at least in part, provides a quantified relationship between a maximum elevation steering angle or range (θmax) and respective UCA diameter (e.g. aperture) size and corresponding dual CP waveguide antenna element number N in the UCA that can be used (e.g. as a guide) in designing (e.g. configuring) a particular OAM beam steering antenna 50 according to implementations disclosed herein.

In an implementation, an OAM beam steering antenna 50 has three UCAs. The outermost of such three UCAs may have a diameter (the diameter corresponding for example to that of a circle coinciding with the respective aperture circumference of the outermost UCA) of about 40 times the wavelength of the OAM electromagnetic beam. Such an outermost UCA may include 256 circularly-arranged dual CP waveguide antenna elements 60 each having the same rotational orientation.

In an implementation, a plurality of dual CP waveguide antenna elements 60 in a given UCA includes an even number of dual CP waveguide antenna elements 60. The number of dual CP waveguide antenna elements 60 in a UCA may be a power of two.

In implementations, providing the plurality of concentric UCAs enables, at least in part, transmitting, by the OAM beam steering antenna 50, a single integrated OAM beam having all respective OAM beam components of each UCA directed to encompass a same point (e.g. receiver location). The cone representing the OAM beam can be an oblique cone which is adjustable according to beamsteering parameters. The cone can represent multiple (e.g. three) cones of same or similar shape, each of the multiple cones representative of the respective OAM beam component emitted by each UCA. It is noted that OAM beam divergence (cone angle) depends on a combination of the OAM mode order and the transmitting UCA's diameter or aperture size. A higher order OAM mode will tend to have a higher beam divergence/larger cone angle; while a larger aperture size will tend to lead to a lower beam divergence/smaller cone angle. To mitigate the relative difference in beam divergences between UCAs, therefore, the UCAs transmitting higher order OAM modes can be relatively larger in size (diameter or aperture size) than the UCAs transmitting lower order OAM modes. Such size differences can be configured to cause the beam divergences for all OAM modes to be approximately the same or at least similar (e.g. within an acceptable range).

Each OAM beam component has or carries one or more OAM modes of the respective UCA. Providing concentric UCAs enables, at least in part, substantially simultaneous steering of all respective OAM beam components together, thereby providing the emitted beam-steered OAM beam having or carrying all respective modes carried by the individual respective OAM beam components of each UCA of the OAM beam steering antenna 50. In such implementations, respective OAM modes may have a respective directivity of at least about 20 dBi.

In implementations, the maximum OAM mode (absolute value) for a given UCA, is the number of dual CP waveguide antenna elements forming the UCA divided by 4. For example, the OAM mode range for UCA 54 comprising 128 dual CP waveguide antenna elements 60 is OAM modes −32 to +32.

In implementations, a first UCA 52 having a first aperture (e.g. first diameter) is configured to emit an OAM beam component having a first mode order (e.g. a first rotational OAM mode number (=+1) of one or more OAM modes. A second UCA 54 having a second aperture (e.g. second diameter), which is larger than the first aperture, is configured to emit an OAM beam component having a corresponding second mode order higher than the first mode order (e.g. a second rotational OAM mode number/=+2). The larger the UCA aperture (e.g. diameter), the higher the order of the OAM mode(s) emitted via the corresponding UCA. The one or more OAM modes emitted by the corresponding UCA is determined, at least in part, by the respective aperture (e.g. diameter) of the UCA.

In implementations, OAM beam steering antenna 50 comprises one or more electromagnetic signal confining structures between each neighboring UCA. Each one or more electromagnetic signal confining structures is also coplanar with respect to each other and is further coplanar with respect to the plurality of concentric UCAs. Therefore, in implementations, the OAM beam steering antenna 50 can have a substantially flat top surface 106. In implementations, at least one possible benefit of the UCAs of the OAM beam steering antenna 50 being co-planar is providing a substantially (e.g. within fabrication tolerances) flat top surface 106 of the OAM beam steering antenna 50. A possible benefit of an OAM beam steering antenna 50 having a flat top surface 106 is improved gain for an OAM beam emitted by the OAM beam steering antenna 50. Another possible benefit of an OAM beam steering antenna 50 having a flat top surface 106 is improved directivity (e.g. focus, convergence at a receiver location) of the OAM beam having at least one higher-order (e.g. non-zero order) OAM mode emitted by the OAM beam steering antenna 50. Another possible benefit is physical compactness.

The respective plurality of circularly-arranged dual CP waveguide antenna elements 60 that form first UCA 52 and second UCA 54 each define a generally circular perimeter. For example, a zoomed in portion of second UCA 54 shown in FIG. 6B displays four dual CP waveguide antenna elements 60 arranged around a part of circumference 75 of the second UCA 54. However, first UCA 52 and second UCA 54 (and any optionally additional UCAs of OAM beam steering antenna 50) may not be perfectly concentric or defined by a perfectly circular arrangement of dual CP waveguide antenna elements 60. For example, a level of variability during the manufacturing process is expected. In implementations, a plurality of dual CP waveguide antenna elements 60 forming a UCA may be deliberately arranged in in an imperfect circle, but overall, the arrangement may be substantially circular and substantially concentric with respect to other UCAs of the OAM beam steering antenna 50.

As shown in FIG. 6B, each dual CP waveguide antenna element 60 comprises a central axis 71 passing through the center thereof (from the bottom to the top thereof). Each dual CP waveguide antenna elements 60 also comprises a rotational orientation 73 about its central axis 71.

Dual CP waveguide antenna elements 60 impart circular polarization properties to OAM EM signals emitted therefrom. In the exemplary implementation shown in FIG. 6B, the top end 59 of each dual CP waveguide antenna element 60 comprises an output port 63 for emitting and/or receiving an OAM beam, comprising RHCP and/or LHCP properties. In the exemplary implementation, each dual CP waveguide antenna element 60 also comprises, at a respective bottom end 61, thereof, a first input port 65 and a second input port 66.

In implementations, first input port 65 is configured for transmitting and/or receiving one or more right-hand circular polarized (RHCP) component(s) of an OAM EM beam and second input port 66 is configured for transmitting and/or receiving one or more left-hand circular polarized (LHCP) component(s) of an OAM EM beam.

Advantageously, providing each dual CP waveguide antenna element 60 with the ability to emit and/or receive RHCP and LHCP components of an OAM beam allows for capacity increase, increased steering range, reduced grating lobes, and/or miniaturization of OAM beam steering antenna 50.

In an implementation, each neighboring pair of dual CP waveguide antenna elements 60 of the plurality of dual CP waveguide antenna elements 60 which form a given UCA are spaced apart by a distance 77. In an implementation, distance 77 is substantially the same (e.g. within fabrication tolerances) between each neighboring pair of dual CP waveguide antenna elements 60 for a given UCA. For example, as shown in FIG. 6B, neighboring pairs of dual CP waveguide antenna elements 60 which form second UCA 54 are spaced apart at an equal distance 77 from one another (i.e. from the respective central axis of 71 of each neighboring dual CP waveguide antenna element 60). Since dual CP waveguide antenna elements 60 in the second UCA 54 have the same rotational orientation 73, the sidewalls of neighboring pairs of rectangularly shaped dual CP waveguide antenna elements 60 which form second UCA 54 are also spaced at an equal distance from one another.

In an implementation, OAM beam steering antenna 50 can receive and/or transmit an OAM beam within a frequency range of about DC 0 Hz to about DC 500 GHz. OAM beam steering antenna 50 will have a central frequency corresponding to an OAM EM beam frequency at which the antenna exhibits optimal performance. In an implementation, the distance 77 between neighboring dual CP waveguide antenna elements 60 for a given UCA is equal to about half the wavelength of the OAM EM beam at the central frequency. Such spacing may result in a broad range of beam steering and relatively less grating lobes.

In an implementation, the spacing (i.e. distance) 77 between adjacent dual CP waveguide antenna elements 60 is substantially the same (e.g. within fabrication tolerances) for all UCAs of the OAM beam steering antenna 50. For example, the distance 77 between neighboring dual CP waveguide antenna elements forming first UCA 52 and the distance 77 between neighboring dual CP waveguide antenna elements forming second UCA 54 may be the same or substantially the same.

In an implementation, the spacing (i.e. distance) 77 between adjacent dual CP waveguide antenna elements 60 is different for different UCAs of the OAM beam steering antenna 50. For example, the distance 77 between neighboring dual CP waveguide antenna elements forming first UCA 52 may be different than the distance 77 between neighboring dual CP waveguide forming second UCA 54.

As readily understood by a person skilled in the art, the spacing (i.e. distance) 77 between adjacent dual CP waveguide antenna elements 60 is configurable. Such spacing may be configurable to satisfy a size requirement of the OAM beam steering antenna 50. Such distance 77 may be configurable to satisfy a performance requirement, such as, for example facilitating constructive interference between adjacent (beam steered) OAM beam signals emitted from each dual CP waveguide antenna element 60 resulting in emission of a substantially circularly uniform respective OAM beam component of the OAM EM beam.

In an implementation, the plurality of dual CP waveguide antenna elements 60 forming a given UCA each have the same or substantially the same rotational orientation 73. For example, the rectangularly shaped first input port 65 and rectangularly shaped second input port 66 of each dual CP waveguide antenna elements 60 forming a given UCA each comprise a respective width in the same or substantially the same plane and a respective length in the same or substantially the same plane (perpendicular to the plane of the width of the first and second input ports 65, 66).

For example, as shown in the exemplary implementation of FIG. 6B, the plurality of dual CP waveguide antenna elements 60 which form the second UCA 54 each have a same common rotational orientation 73 about their respective central axes 71. In an implementation, the plurality of dual CP waveguide antenna elements 60 which form the first UCA 52 each have a same common rotational orientation 73 about their respective central axes.

In implementations, all dual CP waveguide antenna elements 60 of all UCAs of the OAM beam steering antenna 50 are substantially identical (e.g. within fabrication tolerances). Such dual CP waveguide antenna elements 60 have a same rotational orientation for a particular UCA and among all UCAs. In some implementations, UCAs that include dual CP waveguide antenna elements 60 of same rotational orientation (i.e. within the UCA) may differ in overall rotational orientation with respect to each other. In other words, each UCA may have a same or a different overall rotational orientation of a UCA about the central axis of the OAM beam steering antenna 50. Such overall rotational orientation may be configured, for example, to facilitate alignment with a particular respective feed structure configuration for each UCA.

In some implementations, a respective plurality of dual CP waveguide antenna elements 60 of one UCA may have a first rotational orientation 73 being same for all dual CP waveguide antenna elements 60 of that UCA, and the respective plurality of dual CP waveguide antenna elements 60 of another UCA may have a respective second rotational orientation 73 being different from the first rotational orientation 73, as long as rotational orientation 73 is the same for each dual CP waveguide antenna elements 60 of a particular UCA.

In some implementations, a respective plurality of dual CP waveguide antenna elements 60 of a given UCA may not share a common rotational orientation 73. For example, in implementations, the top edge of output ports 63 of the dual CP waveguide antenna elements 60 forming part of a given UCA may face towards the central axis 81 of OAM beam steering antenna 50.

Each dual CP waveguide antenna element 60 has a respective bottom end 61 for coupling to a respective feed structure. For example, as described in greater detail below, the bottom end 61 of each dual CP waveguide antenna element 60 may be coupled to a feed structure via a microstrip to dual circular polarized waveguide transition.

As further illustrated in FIGS. 6A and 6B, the OAM beam steering antenna 50 includes a plurality of concentric electromagnetic signal confining structures, such as a first EM signal confining structure 82, second EM signal confining structure 84, and third EM signal confining structure 86. Each neighboring pair of UCAs, such as the first UCA 52 and its neighboring second UCA 54, has an electromagnetic signal confining structure interposed therebetween. For example, second EM signal confining structure 84 is positioned between first and second UCAs 52, 54.

OAM beam steering antenna 50 may optionally comprise an electromagnetic signal confining structures surrounding an outermost UCA of the plurality of UCAs forming part of OAM beam steering antenna 50. For example, third EM signal confining structure 86 surrounds the outermost UCA (second UCA 54) in the OAM beam steering antenna 50 shown in FIGS. 6A and 6B. Such an outermost electromagnetic signal confining structure may improve performance of the OAM beam steering antenna 50 by at least partially confining the OAM beam emitted therefrom. Such confining may reduce signal loss of the emitted OAM beam. Such confining may reduce interference of the emitted OAM beam with other potential devices or components which may be in proximity of the OAM beam steering antenna 50 and be at least partially susceptible to such interference. In other implementations, such an outermost electromagnetic signal confining structure may be omitted.

OAM beam steering antenna 50 may also optionally comprise an electromagnetic signal confining structures radially inward with respect to an innermost UCA of the plurality of UCAs forming part of OAM beam steering antenna 50. For example, first EM signal confining structure 82 is located radially inward to the innermost UCA (first UCA 52) in the OAM beam steering antenna 50 shown in FIGS. 6A and 6B.

In implementations, OAM beam steering antenna 50 may comprise a single central dual CP waveguide antenna element 60 along central axis 81 of OAM beam steering antenna 50. Said single central dual CP waveguide antenna element 60 may be configured to emit and/or receive a zero mode OAM component of an OAM beam.

A skilled person will appreciate that UCAs forming part of OAM beam steering antenna 50 are spaced apart from one another by circular, or substantially circular gaps. In implementations, circular gaps also separate UCAs from neighboring EM signal confining structures. In implementations, two or more EM signal confining structures may neighbor each other. In such cases, neighboring EM signal confining structures may be separated by circular gaps. A skilled person will appreciate how to design an appropriately sized circular gaps on the OAM beam steering antenna 50 in order to obtain desirable OAM beam characteristics (eg. high directivity, broad range of steering, low grating lobes).

The size or thickness of circular gaps, as would be readily understood by a person skilled in the art, is designed to at least partially optimize the signal confining of the respective OAM beam component of the UCA by its nearest electromagnetic signal confining structure(s) while adhering to other design constraints such as a respective diameter size (e.g. respective aperture) of next nearest UCA, and the overall size of the OAM beam steering antenna 50. In some implementations, such respective gaps may be up to about the wavelength of the OAM beam. In other implementations, such respective gaps may be equal to about the wavelength of the OAM beam or a (i.e. positive integer) multiple thereof. Such gap sizes correlate with diameters of UCAs and may be configured, for example, in accordance with OAM beam steering antenna 50 size requirements.

The first UCA 52 of OAM beam steering antenna 50 shown in FIG. 6A and FIG. 6B comprises 64 circularly-arranged dual CP waveguide antenna elements 60 and the second UCA 54 comprises 128 circularly-arranged dual CP waveguide antenna elements 60. In implementations, first UCA 52 and second UCA 54 may comprise a differing number of circularly-arranged dual CP waveguide antenna elements 60.

In implementations, OAM beam steering antenna 50 may comprise additional number of UCAs. In an implementation, OAM beam steering antenna 50 may comprise a plurality of (concentric) UCAs includes three (concentric) UCAs having 16 circularly-arranged dual CP waveguide antenna elements 60 in a first (innermost) UCA, 64 circularly-arranged dual CP waveguide antenna elements 60 in a second UCA, and 128 circularly-arranged dual CP waveguide antenna elements 60 in a third (outermost) UCA. Said Implementation may optionally include a single central dual CP waveguide antenna element 60 along the central axis 81 of OAM beam steering antenna 50.

In implementations, all UCAs of the plurality of UCAs and all electromagnetic signal confining structures of the plurality of electromagnetic signal confining structures are concentric and share a same central axis, such as the central axis 81. Possible benefits of such concentric arrangement of UCAs include, but are not limited to, one or more of: facilitating alignment of respective OAM beam components emitted by each UCA, facilitating substantially same cone angles of respective OAM beam components emitted by each UCA, contributing to a compact size of the OAM beam steering antenna 50, and combinations thereof.

Dual CP waveguide antenna elements 60 of UCAs may be coupled (via bottom ends of respective dual CP waveguide antenna elements 60) to a respective feed structure via a microstrip to waveguide transition, for example. In implementations, the 64 dual CP waveguide antenna element 60 forming first UCA 52 are fed by the feeding network shown in FIG. 2. In implementations, the 64 dual CP waveguide antenna element 60 forming second UCA 54 are fed by the feeding network shown in FIG. 3.

As used throughout this disclosure, the term "circularly-arranged" dual circular-polarized waveguide antenna elements should be understood to mean circularly-arranged or substantially circularly-arranged. For example, dual circular-polarized waveguide antenna elements arranged in a regular convex polygon having 6 or more vertices constitutes a UCA comprising "circularly-arranged" dual circular-polarized waveguide antenna elements according to the present disclosure.

As used throughout this disclosure, the term "concentric UCAs" should be understood to mean concentric or substantially concentric. For example, UCAs having a center point offset from the central axis 81 of OAM beam steering antenna 50 by up to 10 percent of the UCAs diameter is considered "concentric" within this disclosure. Moreover, as used throughout this disclosure, the term "concentric" is not intended to limit the arrangement of dual circular-polarized waveguide antenna elements 60 to a circular arrangement. Rather, a "concentric" array is an array that surrounds another array and/or is surrounded by another array.

In implementations, dual circular-polarized waveguide antenna elements 60 forming part of concentric arrays are arranged in a regular convex polygon having 6 or more vertices, or an irregular shape with the concentric array having a generally circular aperture. Accordingly, in some implementations, concentric arrays are not perfectly "circular" or "uniform" and may not be considered a standard UCA.

As used throughout this disclosure, the term "concentric" electromagnetic signal confining structures should be understood to mean concentric or substantially concentric. For example, electromagnetic signal confining structures having a center point offset from the central axis 81 of OAM beam steering antenna 50 by up to 10 percent of the electromagnetic signal confining structures diameter is considered "concentric" within this disclosure. Moreover, as used throughout this disclosure, the term "concentric" is not intended to limit the shape of an electromagnetic signal confining structure to a circular. As noted in greater, detail below, in some implementations, "concentric" electromagnetic signal confining structures are not perfectly "circular". Rather, a "concentric" electromagnetic signal confining structure is an electromagnetic signal confining structure that surrounds a concentric array and/or is surrounded by a concentric array.

Figure 7:
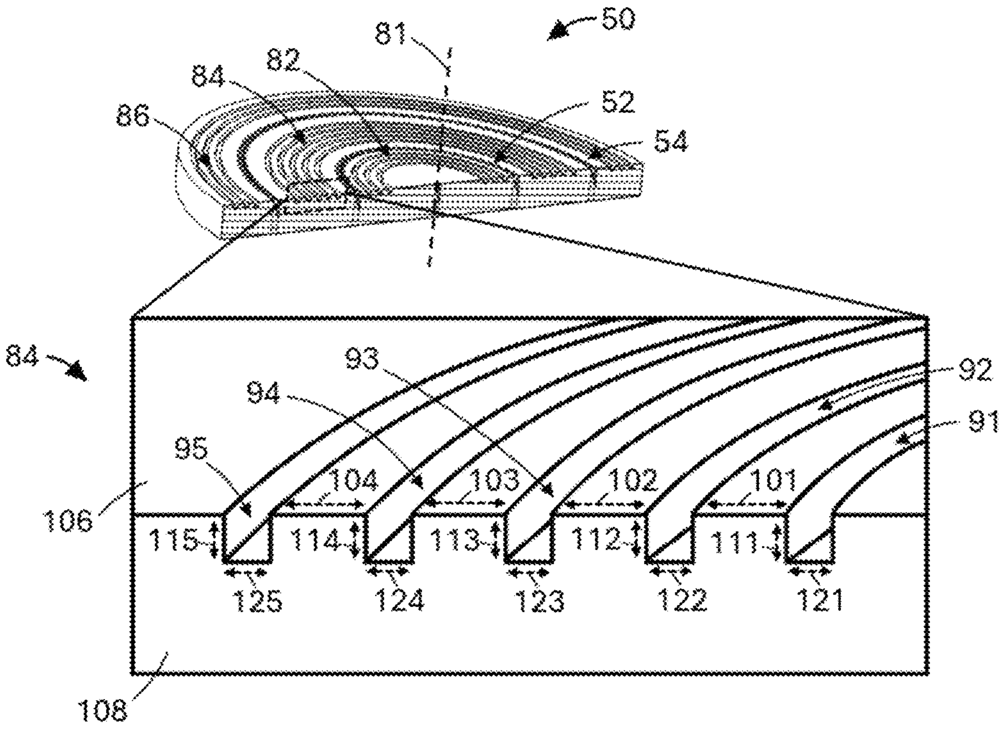
FIG. 7 is a perspective view of a cross-section of an OAM beam steering antenna according to an implementation of the present disclosure including a zoomed in cross-section of an implementation of an electromagnetic signal confining structure thereof.

FIG. 7 is a perspective view of a cross-section of an OAM beam steering antenna 50 according to an implementation of the present disclosure including a zoomed in cross-section of an implementation of an electromagnetic signal confining structure 84 according to an implementation of the present disclosure.

In implementations, OAM beam steering antenna 50 includes a base plate 108 made of a metal (e.g. aluminum) material or another (e.g. composite) material. The plurality of concentric UCAs and the electromagnetic signal confining structures of OAM beam steering antenna 50 may be made of the same material as base plate 108 or of a similar material having substantially similar properties, as would be readily understood by a person skilled in the art. Suitable fabrication techniques known in the art (e.g. microfabrication, computer numerical control (CNC) machining, 3-Dimensional (3D) printing, etc.), may be used for fabricating the plurality of concentric UCAs and the plurality of electromagnetic signal confining structures in base plate 108. The base plate may have a thickness corresponding to the depth 69 of dual CP waveguide antenna element 60, for example. The base plate 108 may have a thickness that is different from the depth 69 of dual CP waveguide antenna elements 60. Notably, the base plate 108 thickness (i.e. top to bottom) must be greater than the depth of (i.e. deepest) electromagnetic signal confining structures in order to allow the formation thereof in the base plate 108.

As shown in FIG. 7, EM signal confining structure 84 includes 5 concentric decoupling rings: a first decoupling ring 91, a second decoupling ring 92, a third decoupling ring 93, a fourth decoupling ring 94, and a fifth decoupling ring 95. The decoupling rings may be substantially circular with uniform curvatures. The decoupling rings may be regular polygons or other shapes formed of a plurality of substantially straight segments forming a closed path. Each decoupling ring as illustrated has a substantially square cross section, with respective decoupling ring side walls being substantially perpendicular to a top surface 106 of the OAM beam steering antenna 50. Each decoupling ring has a respective decoupling ring bottom that is substantially parallel to the top surface 106 of the OAM beam steering antenna 50. Thus, the illustrated decoupling rings are formed as grooves with substantially square cross sections, although other shapes of cross section are also possible.

Each decoupling ring 91, 92, 93, 94, 95 has a respective depth (e.g. respective depth 111, 112, 113, 114, 115, respectively) measured from the top surface 106 of the OAM beam steering antenna 50 to a lowest point of the respective decoupling ring bottom, as contained in a base plate 108. Although in this example decoupling rings are illustrated as having the same depths, in other example all or some decoupling rings may have a different depth.

Each decoupling ring has a respective width (e.g. respective width 121, 122, 123, 124, 125 of rings 91, 92, 93, 94, 95, respectively) measured between respective decoupling ring sidewalls at the top of each decoupling ring near the top surface 106 of the OAM beam steering antenna 50.

The electromagnetic signal confining structure 84 operates generally to mitigate interference (e.g. coupling) between neighboring UCAs and signals emitted thereby. Such mitigation may involve reflection of electromagnetic radiation to confine it within a certain region, confinement via destructive interference, or the like, or a combination thereof.

In implementations, one or more electromagnetic signal confining structures of the OAM beam steering antenna 50 may include three or more decoupling rings. Each of such decoupling rings concentric with the UCAs. Providing at least three decoupling rings for each electromagnetic signal confining structure may improve confinement of the emitted respective OAM beam component of each neighboring UCA, thereby reducing (e.g. below a selected threshold) the interference between respective OAM beam components emitted by neighboring UCAs. In an implementation, the OAM beam steering antenna 50 includes an electromagnetic signal confining structure between each neighboring pair of UCAs and may optionally include an outer electromagnetic signal confining structure surrounding an outermost UCA, each electromagnetic signal confining structure having five decoupling rings. Providing more than five decoupling rings may result in further improvement of such confinement with a potential tradeoff of, for example, increasing the overall size of the OAM beam steering antenna 50, increasing manufacturing time and/or costs, or both.

In implementations, the quantity of decoupling rings of an electromagnetic signal confining structure is limited by the physical space available between neighboring UCAs and, in case the electromagnetic signal confining structure is an outermost electromagnetic signal confining structure, by the overall size or size limitation of the OAM beam steering antenna 50. Therefore, it is possible, in an implementation, to provide fewer than five decoupling rings for one or more electromagnetic signal confining structure given that resulting decrease in confinement and increase in interference (e.g. coupling) between neighboring UCAs (not applicable in case of an outermost electromagnetic signal confining structure) is within acceptable range.

In implementations, each decoupling ring of each electromagnetic signal confining structure (82, 84, and 86) has a depth of about ¼ of the wavelength of the OAM beam at central frequency. Such decoupling ring depth is selected to provide adequate, or optimal (e.g. within a selected threshold) out-of-phase EM signal (i.e. EM signal of respective OAM beam component emitted by a neighboring UCA) confinement via destructive interference.

In other implementations, one (e.g. the innermost) or more of the three or more decoupling rings of one or more electromagnetic signal confining structure may have a depth of about ¼ of the wavelength of the OAM beam at central frequency. The other decoupling rings of the one or more electromagnetic signal confining structure may have a depth shallower than a previous ring innermost to it.

In implementations, the depth of a decoupling ring of an electromagnetic signal confining structure is defined as a distance from a plane that includes the top surface 106 of the OAM beam steering antenna 50 to the lowest point of the decoupling ring bottom.

In an implementation, a possible benefit of each electromagnetic signal confining structure having (at least) three decoupling rings each having a depth of about ¼ of the wavelength of the OAM beam (at central frequency) is providing an isolation or confinement of the EM signal emitted by each UCA adjacent the electromagnetic signal confining structure of at least about 40 dB.

In implementations, the decoupling ring cross-section may be one or more of: substantially rectangular, substantially curved, substantially circular, and combinations thereof.

In implementations, a decoupling ring may be described as a trough. A decoupling ring may have a uniform or varied cross-section at different sections or points of the decoupling ring, while maintaining a substantially constant decoupling ring depth of about ¼ of the wavelength of the OAM beam at central frequency. In other implementations, a decoupling ring may include separate sections having a depth and cross-section as described elsewhere herein with breaks of lesser or substantially zero depth therebetween.

In implementations, a decoupling ring of an EM signal confining structure may be substantially circular having uniform curvature. In other implementations, a decoupling ring may include straight sections joined at an angle therebetween to from a substantially continuous decoupling ring.

In implementations, the spacing between adjacent decoupling rings (eg. 101, 102, 103, 104) may be limited by a physical space available between neighboring UCAs and/or outside an outermost UCA. The spacing between adjacent decoupling rings may be between about ½ of the wavelength of the OAM beam (at central frequency) and about the wavelength size of the OAM beam (at central frequency).

In implementations, width of a decoupling ring at the top of the ring (i.e. at the plane of the top surface 106 of the OAM beam steering antenna 50) may be substantially uniform. In other implementations, the width of a decoupling ring may be varied, such as having one width at one section of the decoupling ring, and another width at another section of the decoupling ring.

In implementations, one or more electromagnetic signal confining structures may include different designs known in the art, other than ring-shape described above, facilitating electromagnetic signal confinement of each neighboring UCA within a selected range, for example.

A decoupling ring may have a conductive surface. In implementations, decoupling rings of the plurality of electromagnetic signal confining structures may be filled with ambient air or any other suitable dielectric material capable of supporting the electromagnetic signal confining properties thereof.

Figure 8A:
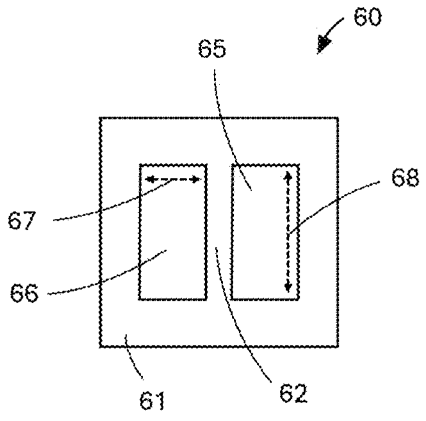
FIG. 8A is a bottom view of a dual CP waveguide antenna element according to an implementation of the present disclosure.
Figure 8B:
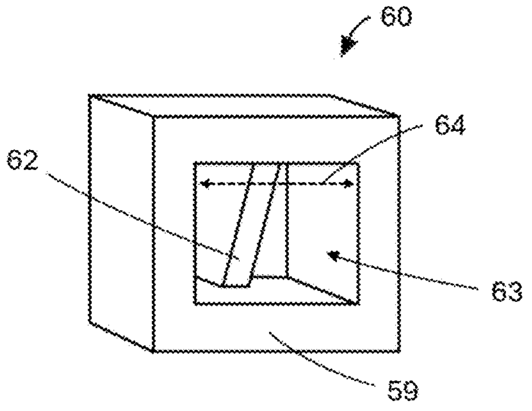
FIG. 8B is a perspective view of the top of a dual CP waveguide antenna element according to an implementation of the present disclosure.
Figure 8C:
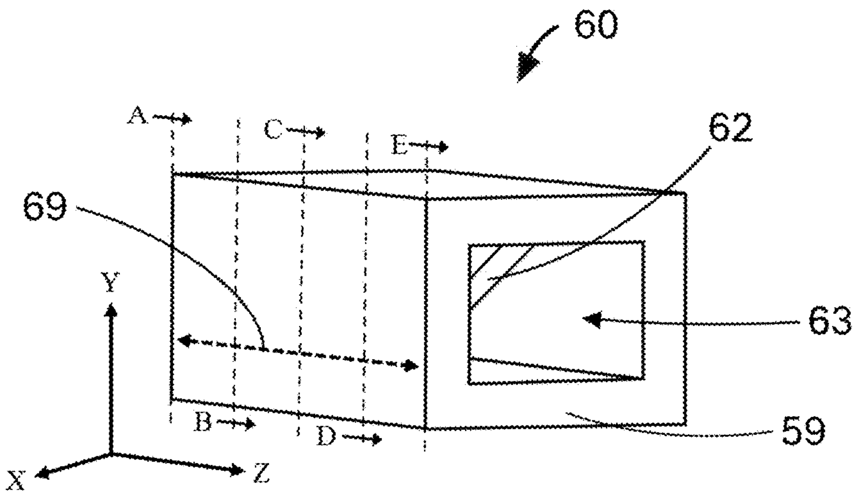
FIG. 8C is a perspective view of the top of a dual CP waveguide antenna element according to an implementation of the present disclosure.

FIG. 8A is a bottom view of a dual CP waveguide antenna element 60 according to an implementation of the present disclosure. FIG. 8B and FIG. 8C each show a perspective view of the top of a dual CP waveguide antenna element 60 according to an implementation of the present disclosure.

The dual CP waveguide antenna elements 60 disclosed herein are capable of emitting and/or receiving a RHCP signal and a LHCP signal.

In implementations, the bottom end 61 of each dual CP waveguide antenna element 60 includes a first input port 65 and a second input port 66. First and second input ports 65, 66 may be rectangular or substantially rectangular, each comprising a respective length and width. The width 67 of second input port 66 may be equal to the width of first input port 65. The length of 68 of first input port 65 may be equal to the length of second input port 66.

In implementations, first input port 65 is configured to transmit and/or receive at least one RHCP component of an OAM beam. In implementations, second input port 66 is configured to transmit and/or receive at least one LHCP component of an OAM beam.

In implementations, the width 67 of the second input port 66 and the width of the first input port 65 is about 0.233 times the wavelength of the OAM beam (at central frequency). In implementations, the length of the second input port 66 and the length 68 of the first input port 65 is about 0.541 times the wavelength of the OAM beam (at central frequency).

As shown in FIGS. 8B and 8C, each dual CP waveguide antenna element 60 comprises a top end 59 with a respective output port 63. Output port 63 comprises a width 64 that is about 0.54 times the wavelength of the OAM beam (at central frequency). Accordingly, in the exemplary implementation, output 53 is slightly rectangular. In implementations, output 53 may have a length equal to width 64.

As shown in FIG. 8C, each dual CP waveguide antenna element 60 comprises a respective depth 69 (eg. along a z-axis). In implementations, depth 69 of each dual CP waveguide antenna element 60 may be about two times the wavelength of the OAM EM beam (at central frequency).

In implementations, a partial wall 62 separates first input port 65 and second input port 66. As shown in FIGS. 8A, 8B, and 8C, partial wall 62 fully separates first input port 65 and second input port 66 into two discrete ports at bottom end 61 of dual CP waveguide antenna element 60. In the exemplary implementations shown in FIGS. 8A, 8B, and 8C, partial wall 62 is gradually tapered along one side thereof along the z-axis of dual CP waveguide antenna element 60 such that partial wall 62 completely ceases before reaching output port 63. In other implementations, partial wall 62 may transition in a step-wise fashion from a full wall starting at bottom end 61 of dual CP waveguide antenna element 60 to being non-existent at top end 59 of dual CP waveguide antenna element 60. In other implementations, the partial wall 62 may transition from a full barrier at bottom end 61 to no barrier at top end 59 in an irregular fashion.

In an implementation, at bottom end 61 of dual CP waveguide antenna element 60, partial wall 62 spans between a center point of a first end inside the conduit of dual CP waveguide antenna element 60 and a center point of a second end inside the conduit of dual CP waveguide antenna element 60, the second end being opposite to the first. In an implementation, partial wall 62 diminishes in size from the bottom end 61 to the top end 59 of dual CP waveguide antenna element 60 and ceases to exist before reaching output port 63. Accordingly, in implementations, output port 63 is a unitary port undivided by partial wall 62.

In implementations, each dual CP waveguide antenna element 60 (including partial wall 62) may be a unitary structure. In implementations, partial wall 62 may be a separate component installable into the conduit of a dual CP waveguide antenna element 60. In implementations, each dual CP waveguide antenna element 60 is a unitary structure with the base plate 108 of OAM beam steering antenna 50. In implementations, base plates 108 and dual CP waveguide antenna elements 60 are manufactured as separate components and dual CP waveguide antenna elements 60 are installable into base plate 108.

In implementations, partial wall 62 is composed of the same material as base plates 108 and dual CP waveguide antenna elements 60. In other implementations, partial wall 62 is composed of a different material than base plates 108 and/or dual CP waveguide antenna elements 60.

In the exemplary implementation, the purpose of partial wall 62 is to facilitate: separation of RHCP and LHCP EM signals, conversion of linear polarization to circular polarization, and miniaturization of the dual CP waveguide antenna element 60 aperture. In implementations, partial wall 62 may not be tapered and may fully divide the cavity of the waveguide until about a midpoint thereof.

EM energy may be fed into first input port 65 and second input port 66 via the bottom end 61 of dual CP waveguide antenna element 60. In implementations, a RHCP EM is signal emitted out of output port 63 via first input port 65 and a LHCP EM signal is signal emitted out of output port 63 via second input port 66. In implementations, first input port 65 is configured to receive a RHCP OAM EM signal, which can then be processed by one or more feed structures. In implementations, second input port 66 is configured to receive LHCP OAM EM signal, which can then be processed by one or more feed structures.

In implementations, a LHCP EM is signal emitted out of output port 63 via first input port 65 and a RHCP EM signal is signal emitted out of output port 63 via second input port 66. In implementations, first input port 65 is configured to receive a LHCP OAM EM signal, which can then be processed by one or more feed structures. In implementations, second input port 66 is configured to receive RHCP OAM EM signal, which can then be processed by one or more feed structures.

In implementations, the cavity (i.e. conduit) of dual CP waveguide antenna elements 60 comprise a square or rectangular cross-section through their depth 69 (i.e. the z-axis shown in FIG. 8C). In implementations, dual CP waveguide antenna elements 60 may comprise a circular, ovular, or irregular cross-section through their depth 69.

In implementations, the shape of first input port 65 and second input port 66 are rectangular and the shape of output port 63 is substantially square, however, in other implementations other shapes may be implemented.

In an implementation, the cavities of dual CP waveguide antenna elements 60 are filled with an ambient air or other suitable dielectric material within which electromagnetic signals of the OAM beam components can propagate with suitably (e.g. within a predetermined threshold) low losses.

In implementations, the first input port 65 and second input port 66 of dual CP waveguide antenna element 60 are sized for optimal coupling to a feed structure, for example, via a microstrip to waveguide transition.

As readily understood by a person skilled in the art, some or all of the dimensions of the dual CP waveguide antenna element 60, such as respective port shapes and sizes, the depth 69 of the dual CP waveguide antenna element 60 (eg. along the z-axis shown in FIG. 8C), and the dual CP waveguide antenna element 60 conduit shape may be configured to satisfy a performance requirement directed at, for example, one or more of: optimizing electromagnetic signal confinement, minimizing grating lobes, optimizing side lobes, etc.

In implementations, the geometry and design of the dual CP waveguide antenna elements 60 is not limited to the exemplary implementations described herein with reference to FIGS. 8A, 8B and 8C. In implementations, other dual CP waveguide antenna element designs known in the art and capable of receiving OAM beam component signals and imparting LHCP and RHCP properties onto EM signals and emitting the respective OAM beam components comprising LHCP and RHCP states may be used in the circular arrays of the OAM beam steering antenna 50 disclosed herein. As readily understood by a person skilled in the art, dimensions of dual CP waveguide antenna elements 60 may be configured to provide an optimum or an improved performance in terms of, for example, electromagnetic energy propagation, emission, confinement, coupling and such.

Figure 9:
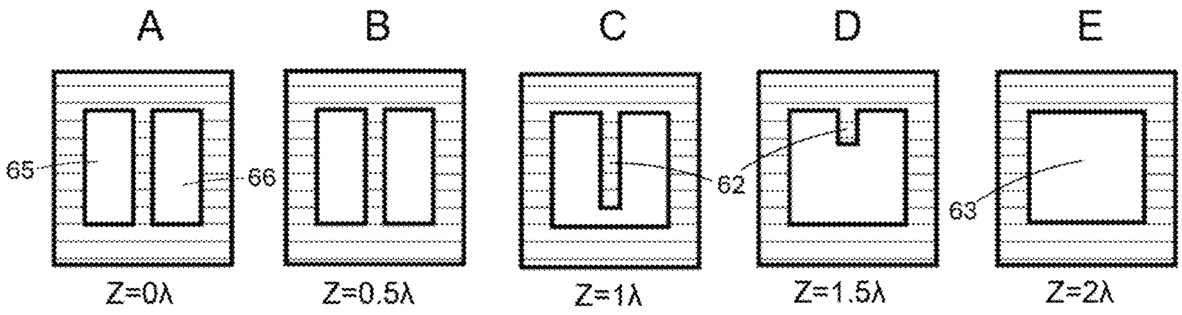
FIG. 9 shows cross-section views along various z-axis positions of a dual CP waveguide antenna element according to an implementation of the present disclosure.

FIG. 9 shows cross-section views along various z-axis positions of a dual CP waveguide antenna element 60 according to an implementation of the present disclosure. Cross-section A, B, C, D, and E in FIG. 9 correspond to cross-section locations A, B, C, D, and E, respectively, along the depth 69 of dual CP waveguide antenna element 60 as shown in FIG. 8C.

In the exemplary implementation shown in FIG. 9, circular polarized waveguide antenna element 60 has a depth 69 equal to two times the wavelength (λ) of OAM beam (i.e. depth 69=2λ) at central frequency of the OAM beam steering antenna 50.

Cross-section A is located at a depth 69 equal to zero times the wavelength (λ) of OAM beam (at central frequency), corresponding to the plane of the bottom end 61 of dual CP waveguide antenna element 60.

Cross-section B is located at a depth 69 equal to half the wavelength (λ) of OAM beam (at central frequency), corresponding to a plane parallel to the bottom end 61 of dual CP waveguide antenna element 60 located a quarter of the depth 69 away from bottom end 61.

Cross-section C is located at a depth 69 equal to the wavelength (λ) of OAM beam (at central frequency), corresponding to a plane parallel to the bottom end 61 of dual CP waveguide antenna element 60 located a half of the depth 69 away from bottom end 61.

Cross-section D is located at a depth 69 equal to 1.5 times the wavelength (λ) of OAM beam (at central frequency), corresponding to a plane parallel to the bottom end 61 of dual CP waveguide antenna element 60 located three quarters of the depth 69 away from bottom end 61.

Cross-section E is located at a depth 69 equal to double the wavelength (λ) of OAM beam (at central frequency), corresponding to the plane of the top end 59 of dual CP waveguide antenna element 60.

As shown in cross-section A of FIG. 9, partial wall 62 fully separates first input port 65 from second input port 66. Throughout the cross-sections (from A to E), partial wall 62 progressively recedes from one side thereof, and at cross-section E partial wall 62 ceases to exist, resulting in an unobstructed unitary output port 63. As noted above, a skilled person will appreciate that partial may be configured differently than the exemplary implementation shown in FIG. 9. For example, partial wall 62 may transition in a variety of manners from a full barrier at bottom end 61 of dual CP waveguide antenna element 60 to non-existing at top end 59 of dual CP waveguide antenna element 60.

One benefit of a single waveguide antenna element having dual CP properties is to enable overall miniaturization of OAM beam steering antenna 50. Miniaturization enables easier transportation of OAM beam steering antenna 50 and can also allow a greater number of UCAs to be included in OAM beam steering antenna 50, thereby allowing for a greater capacity of OAM beam steering antenna 50. Antenna miniaturization can also allow higher gain and/or a more focused conical OAM beam.

In implementations, a full wall may be used to separate dual CP propertied to dual CP waveguide antenna element 60. In other implementations, a wall is not used. Other types of dual CP antenna elements may be used in the circular arrays of the OAM beam steering antenna 50 disclosed herein.

Figure 10:
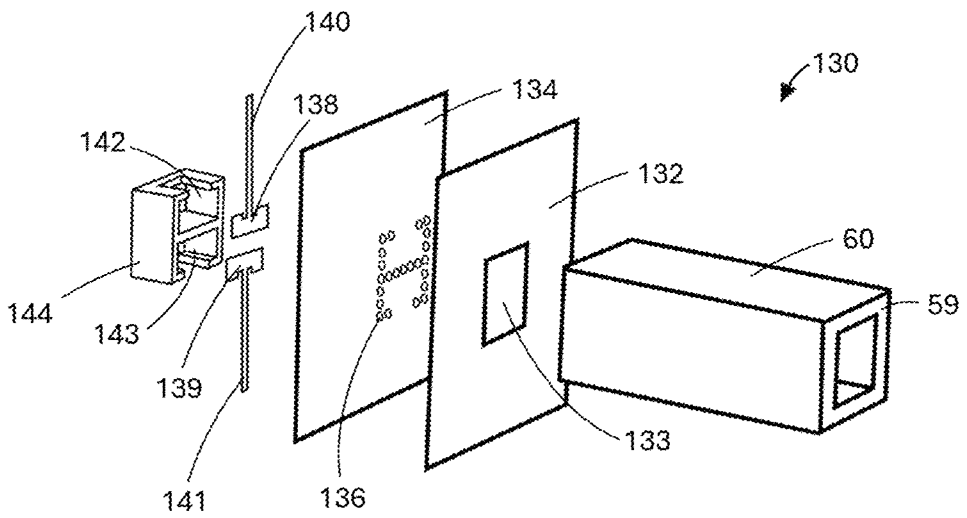
FIG. 10 is an exploded view of a microstrip to dual CP waveguide transition according to an implementation of the present disclosure.

FIG. 10 is an exploded view of a microstrip to dual circular polarized waveguide transition 130 according to an implementation of the present disclosure. Each exemplary microstrip to dual circular polarized waveguide transition 130 feeds the bottom end 61 of a dual CP waveguide antenna element 60 shown in FIGS. 8A, 8B, and 8B.

Microstrip to dual circular polarized waveguide transition 130 comprises a ground plane 132 and a dielectric substrate 134 comprising a plurality of via holes 136. Ground plane 132 comprises an aperture 133 for coupling to a bottom end 61 of dual CP waveguide antenna element 60. Dielectric substrate 134 separates ground plane 132 from a first microstrip 140 and a second microstrip 141.

Each microstrip 140, 141 conveys EM signal into the bottom end 61 of dual CP waveguide antenna element 60. In the exemplary implementation, first microstrip 140 conveys an OAM beam component into the first input port 65 of dual CP waveguide antenna element 60. In the exemplary implementation, second microstrip 141 conveys an OAM beam component into the second input port 66 of dual CP waveguide antenna element 60.

In implementations, first input port 65 of dual CP waveguide antenna element 60 receives an OAM beam component comprising RHCP signal, which is received by first microstrip 140 and processed by a feed structure. In implementations, second input port 66 of dual CP waveguide antenna element 60 receives an OAM beam component comprising LHCP signal, which is received by second microstrip 141 and processed by a feed structure. In implementations, first input port 65 receives LHCP signal, which is received by first microstrip 140 and processed by a feed structure, and second input port 66 receives RHCP signal, which is received by second microstrip 141 and processed by a feed structure. In implementations, dual CP waveguide antenna elements 60 can transmit and receive OAM EM beam signal components.

In implementations, each microstrip 140, 141 couples a respective port of front-end module of a feed structure to a first input port 65 and second input port 66 of dual CP waveguide antenna element 60, respectively. Accordingly, microstrips 140, 141 enable EM signal transmission between one or more feed structures and a dual CP waveguide antenna element 60.

In implementations, first microstrip 140 comprises a first waveguide short pattern 138 near the end of first microstrip 140 for transmitting/receiving signal to/from one of the input ports at bottom end 61 of dual CP waveguide antenna element 60. In implementations, second microstrip 141 comprises a second waveguide short pattern 139 near the end of second microstrip 141 for transmitting/receiving signal to/from one of the input ports at bottom end 61 of dual CP waveguide antenna element 60. Waveguide short patterns 138, 139 confine the directionality of EM signal emitted out of microstrips 140, 141 and into bottom end 61 of dual CP waveguide antenna element 60.

Via holes 136 in dielectric substrate 134 are arranged in a manner to surround the boarder of waveguide short patterns 138, 139. Via holes 136 facilitate directing EM signal between first and second microstrips 140, 141 and first and second input ports 65, 66, respectively.

First and second waveguide short patterns 138, 139 are located between dielectric substrate 134 and a respective back short waveguide 142, 143. For example, first back short waveguide 142 surrounds first waveguide short pattern 138 on the side opposite to the side of first waveguide short pattern 138 which faces dielectric substrate 134. Likewise, second back short waveguide 143 surrounds second waveguide short pattern 139 on the side opposite to the side of second waveguide short pattern 139 which faces dielectric substrate 134.

First and second back short waveguides 142, 143 prevent unwanted signal reflection and facilitate signal communication between first and second microstrips 140, 141 and first and second input ports 65, 66, respectively. First and second back short waveguides 142, 143 each comprise a respective opening providing an entry point for first and second microstrips 140, 141, respectively, into each respective back short waveguide.

As is known to a skilled person in the art, first and second back short waveguides 142, 143 may be manufactured from a metallic or other suitable material. In an implementation, first back short waveguide 142 and second back short waveguide 143 are formed from a single unitary body 144. In other implementations, back short waveguides 142, 143 are manufactured as separate components.

In implementations, the microstrip to dual circular polarized waveguide transition 130 associated with a particular dual CP waveguide antenna element 60 is in communication with various other one or more components or devices (e.g. component/device(s) for processing in accordance with the one or more OAM modes, component/devices for processing in accordance with the beamsteering parameters, power splitter(s), phase adjuster(s), etc.) of a corresponding feed structure associated with the particular dual CP waveguide antenna element 60.

Microstrip to dual circular polarized waveguide transition 130 may comprise other conductive/nonconductive features to cause efficient transmission of EM signal between dual CP waveguide antenna elements 60 and EM signal processing components. As readily understood by a person skilled in the art, any components, materials and dimensions of the microstrip to waveguide transition can be configured to suit the design and operation of the OAM beam steering antenna 50. For example, a structure other than the exemplary structure shown in FIG. 10 may be used.

Figure 11:
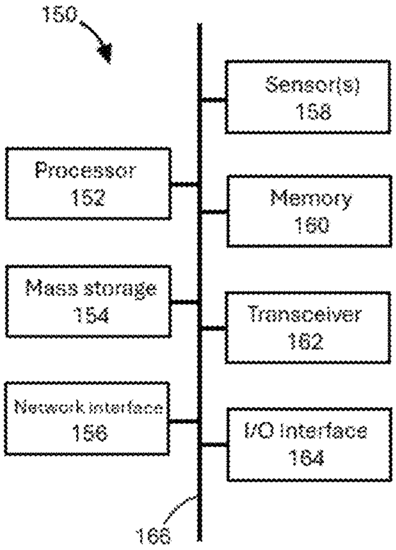
FIG. 11 is a schematic illustration of an electronic device that may facilitate operation of an OAM beam steering antenna system according to implementations of the present disclosure.

FIG. 11 is a schematic illustration of an electronic device 150 that may facilitate operation of an OAM beam steering antenna system 100 according to implementations of the present disclosure.

In implementations, one or more feed structures are configured to process input signal(s) in accordance with the one or more OAM mode and beamsteering parameters to output a plurality of OAM component signals.

In implementations, the beamsteering parameters include an azimuth steering angle ranging from about 0° to about 360°, an elevation steering angle ranging from about-42° to about 42° measured from a central axis of the plurality of concentric arrays (for example UCAs) to a central axis of a beam conical of the emitted OAM electromagnetic beam, or both the azimuth steering angle and the elevation steering angle. In the transmit configuration, the OAM beam comprising respective OAM beam components emitted by corresponding UCAs is steerable in accordance with the beamsteering parameters. The beamsteering parameters may be predetermined by an electronic device described with reference to FIG. 11, for example. The beamsteering parameters may be fixed for a stationary OAM beam steering antenna emitting an OAM beam directed towards a stationary receiver, for example. The beamsteering parameters may be adjustable (e.g. substantially in real time, with a delay within a predetermined acceptable range) in response to a movement of a device having the OAM beam steering antenna thereat, a movement of a device having a receiver receiving the OAM beam thereat, or both. Such adjusting or beam-steering of the OAM beam may be facilitated at least in part by the electronic device described with reference to FIG. 11, for example.

FIG. 11 shows a schematic diagram of an electronic device 150 that may explicitly or implicitly facilitate operation of the OAM beam steering antenna 50 described herein, according to different implementations of the present disclosure. For example, a computer equipped with network function may be configured as electronic device 150. The electronic device 150 may be used to facilitate (e.g. control, monitor, automatically adjust) the operation of the OAM beam steering antenna 50 or any one or more components thereof. For example, the electronic device 150 may be used to (e.g. substantially automatically) determine the beamsteering parameters and cause feed structures (e.g. via suitable devices or components thereof) to process signals in accordance with such beamsteering parameters. In implementations, electronic device 150 may be used to facilitate the operation of OAM beam steering antenna systems 100 disclosed herein.

As shown in FIG. 11, the electronic device 150 may include a processor 152, such as a central processing unit (CPU) or specialized processors such as a graphics processing unit (GPU) or other such processor unit, memory 160, network interface 156, and a bi-directional bus 166 to communicatively couple the components of electronic device 150. Electronic device 150 may also include as needed non-transitory mass storage 154, an I/O interface 164, one or more sensor 158, and a transceiver 162. According to certain implementations, any or all of the depicted elements may be utilized, or only a subset of the elements. Further, the electronic device 150 may contain multiple instances of certain elements, such as multiple processors, memories, or transceivers. Also, elements of the hardware device may be directly coupled to other elements without the bi-directional bus 166. Additionally, or alternatively to a processor and memory, other electronics, such as integrated circuits, may be employed for performing the required logical operations.

The memory 160 may include any type of tangible, non-transitory memory such as static random-access memory (SRAM), dynamic random access memory (DRAM), synchronous DRAM (SDRAM), read-only memory (ROM), any combination of such, or the like. The mass storage element 154 may include any type of tangible, non-transitory storage device, such as a solid state drive, hard disk drive, a magnetic disk drive, an optical disk drive, USB drive, or any computer program product configured to store data and machine executable program code. According to certain implementations, the memory 160 or mass storage 154 may have recorded thereon statements and instructions executable by the processor 152 for performing any of the aforementioned method operations described above.

Network interface(s) 156 may include at least one of a wired network interface and a wireless network interface. The network interface 156 may include a wired network interface to connect to a communication network and may also include a radio access network interface for connecting to the communication network or other network elements over a radio link. The network interface enables the electronic device 150 to communicate with remote entities such as those connected to the communication network, for example using apparatuses and methods of the present disclosure.

The one or more sensors 158 may track a location of another device for receiving the OAM beam emitted by the OAM beam steering antenna 50, or sending an OAM beam to be received by the OAM beam steering antenna 50, for example. The one or more sensors 158 may be in communication with a global positioning system (GPS). The one or more sensors 158 may be in communication with a network via network interface(s) 156, for example, one or more sensors 158 may be a part of a transceiver 162.

It will be appreciated that, although specific implementations of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding implementations, the use and/or operation of the present disclosure may be facilitated or supported by using hardware only or by using software and a necessary universal hardware platform. A corresponding software product may be stored in a non-volatile or non-transitory storage medium, which can be a compact disk read-only memory (CD-ROM), USB flash disk, or a removable hard disk. The software product may include a number of instructions that enable a computer device (personal computer, server, or network device) to facilitate or support the use and/or operation of the apparatuses and methods disclosed herein. For example, such enablement may correspond to a simulation of logical operations pertaining at least one of input signals, beamforming, respective one or more OAM modes, and beamsteering parameters. The software product may additionally or alternatively include number of instructions that enable a computer device to execute operations for configuring or programming a digital logic apparatus in order to facilitate or support the use and/or operation of implementations of the present disclosure.

Figure 12A:
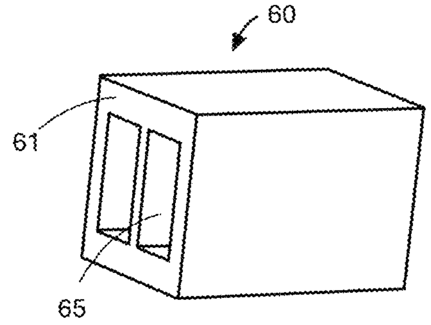
FIG. 12A is a perspective view showing the bottom of a dual CP waveguide antenna element according to an implementation of the present disclosure.

FIG. 12A is a perspective view showing the bottom of a dual CP waveguide antenna element 60, similar to the dual CP waveguide antenna element 60 shown in FIGS. 8A, 8B, and 8C.

Figure 12B:
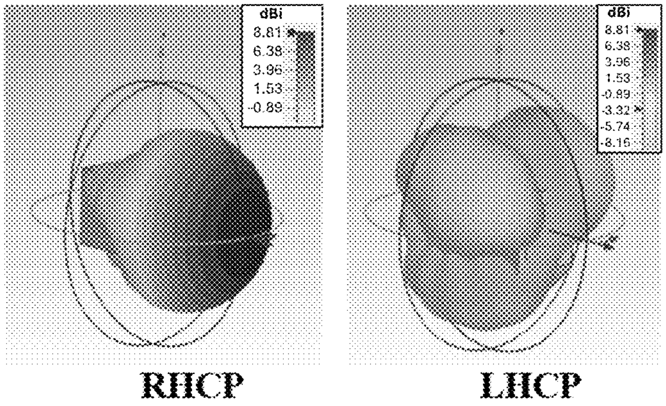
FIG. 12B shows simulated radiation patterns of right-hand circular polarized (RHCP) radiation and left-hand circular polarized (LHCP) radiation transmitted from a first input port out through an output port of a dual CP waveguide antenna element according to an implementation of the present disclosure.

FIG. 12B shows simulated radiation patterns of RHCP radiation and LHCP radiation transmitted from the first input port 65 out through output port 63 of the dual CP waveguide antenna element 60 shown in FIG. 12A.

The radiation patterns in FIG. 12B were generated using CST Microwave Studio (which is part of the CST Studio Suite®) using the dual CP waveguide antenna element 60 shown in FIG. 12A.

As shown in FIG. 12B, RHCP radiation emitted from output port 63 comprises a uniform cone shape with high directivity. On the other hand, LHCP radiation emitted from output port 63 has low directivity. These results indicate that a first input port 65 of a dual CP waveguide antenna element 60 can selectively emit RHCP radiation effectively.

Figure 12C:
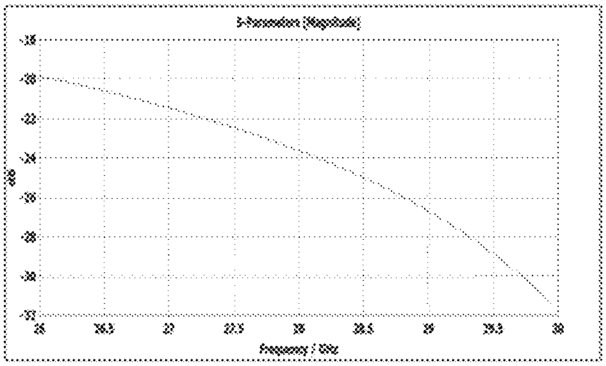
FIG. 12C shows the reflection coefficient as a function of frequency of RHCP radiation transmitted through a first input port of a dual CP waveguide antenna element according to an implementation of the present disclosure.

FIG. 12C shows the reflection coefficient as a function of frequency of RHCP radiation transmitted through first input port 65 of a dual CP waveguide antenna element 60 according to an implementation of the present disclosure.

In particular, FIG. 12C graphs an S11 parameter (reflection coefficient for first input port 65) from a frequency range of 26 GHz-30 GHz. The S11 parameter graphed in FIG. 12C was generated using CST Microwave Studio (which is part of the CST Studio Suite®). The S11 parameter is generally less than-20 dB through the tested frequency range, indicating excellent transmission of RHCP EM signal through the first input port 65 and negligible reflection.

Figure 13A:
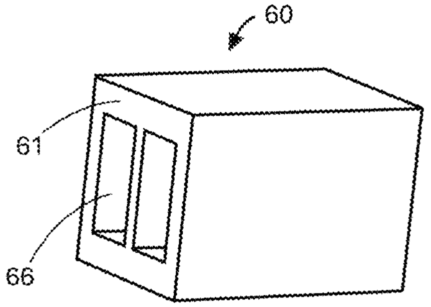
FIG. 13A is a perspective view showing the bottom of a dual CP waveguide antenna element according to an implementation of the present disclosure.

FIG. 13A is a perspective view showing the bottom of a dual CP waveguide antenna element 60, similar to the dual CP waveguide antenna element 60 shown in FIGS. 8A, 8B, and 8C.

Figure 13B:
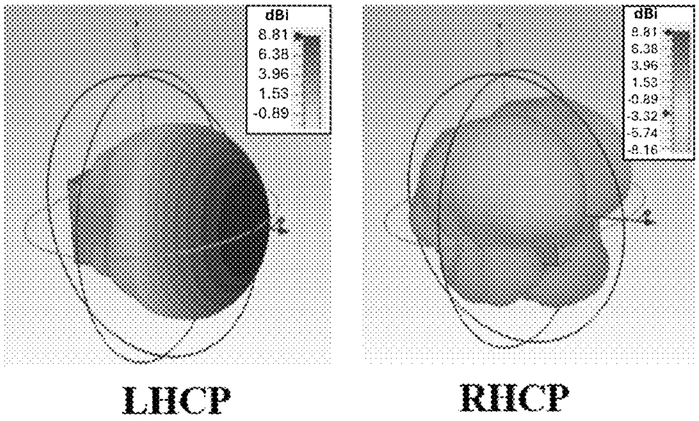
FIG. 13B shows simulated radiation patterns of RHCP radiation and LHCP radiation transmitted from a second input port out through an output port of a dual CP waveguide antenna element according to an implementation of the present disclosure.

FIG. 13B shows simulated radiation patterns of RHCP radiation and LHCP radiation transmitted from the second input port 66 out through output port 63 of the dual CP waveguide antenna element 60 shown in FIG. 13A.

The radiation patterns in FIG. 13B were generated using CST Microwave Studio (which is part of the CST Studio Suite®) using the dual CP waveguide antenna element 60 shown in FIG. 13A.

As shown in FIG. 13B, LHCP radiation emitted from output port 63 comprises a uniform cone shape with high directivity. On the other hand, RHCP radiation emitted from output port 63 has low directivity. These results indicate that a second input port 66 of a dual CP waveguide antenna element 60 can selectively emit LHCP radiation effectively.

Notably, since the first input port 65 and second input port 66 in the simulated dual CP waveguide antenna element 60 are symmetrical, FIG. 12C also shows the S22 parameter (reflection coefficient for second input port 66). As shown in FIG. 12C, the S22 parameter is generally less than −20 dB through the tested frequency range, indicating excellent transmission of LHCP EM signal through the second input port 66 and negligible reflection.

Figure 13C:
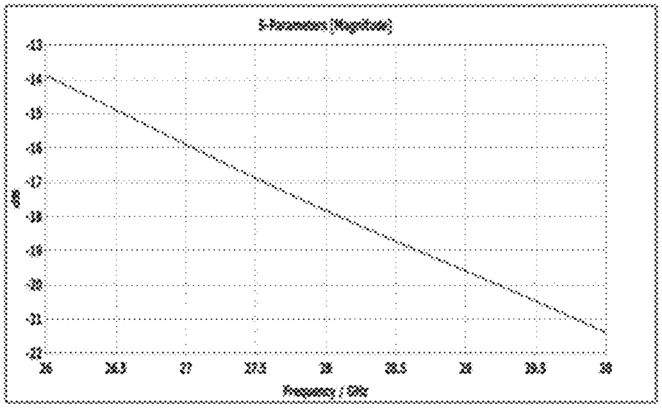
FIG. 13C shows the transmission coefficient as a function of frequency of LHCP radiation transmitted from a second input port to a first input port of a dual CP waveguide antenna element according to an implementation of the present disclosure.

FIG. 13C shows the transmission coefficient as a function of frequency of LHCP radiation transferred from the second input port 66 to the first input port 65 of a dual CP waveguide antenna element 60 according to an implementation of the present disclosure (i.e. the S12 parameter). Since the first input port 65 and second input port 66 in the simulated dual CP waveguide antenna element 60 are symmetrical, FIG. 13C also shows the transmission coefficient as a function of frequency of RHCP radiation transferred from the first input port 65 to the second input port 66 of a dual CP waveguide antenna element 60 according to an implementation of the present disclosure (i.e. the S21 parameter).

The transmission coefficient shown in was generated using CST Microwave Studio (which is part of the CST Studio Suite®). As indicated in FIG. 13C, the S21 and S12 parameters are generally less than −14 dB through the tested frequency range, indicating low coupling between the first input port 65 and the second input port 66.

Figure 14A:
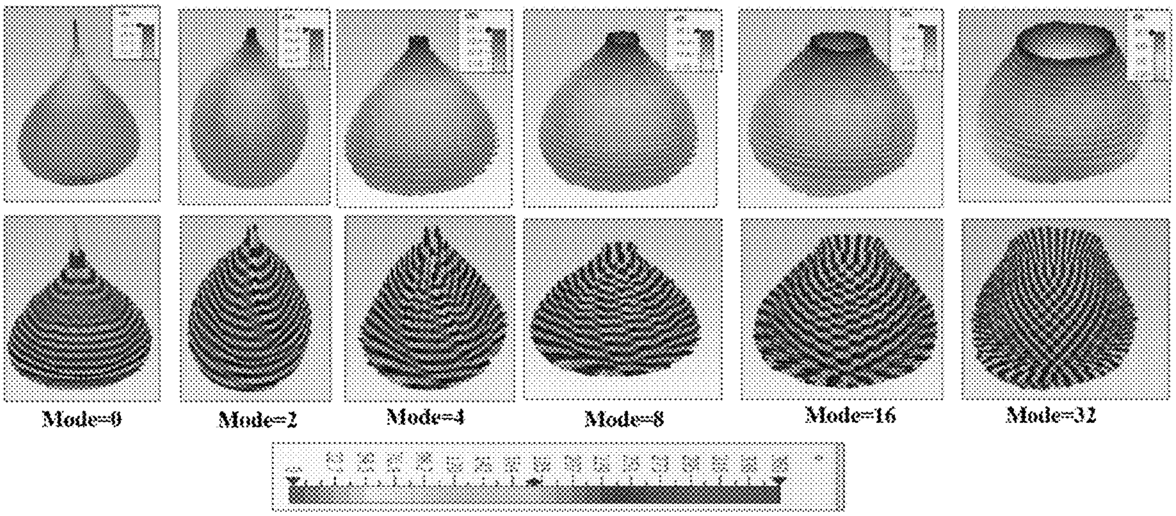
FIG. 14A shows simulated radiation patterns of a zero OAM mode and various positive OAM modes of a UCA comprising 128 dual CP waveguide antenna elements according to an implementation of the present disclosure.
Figure 14B:
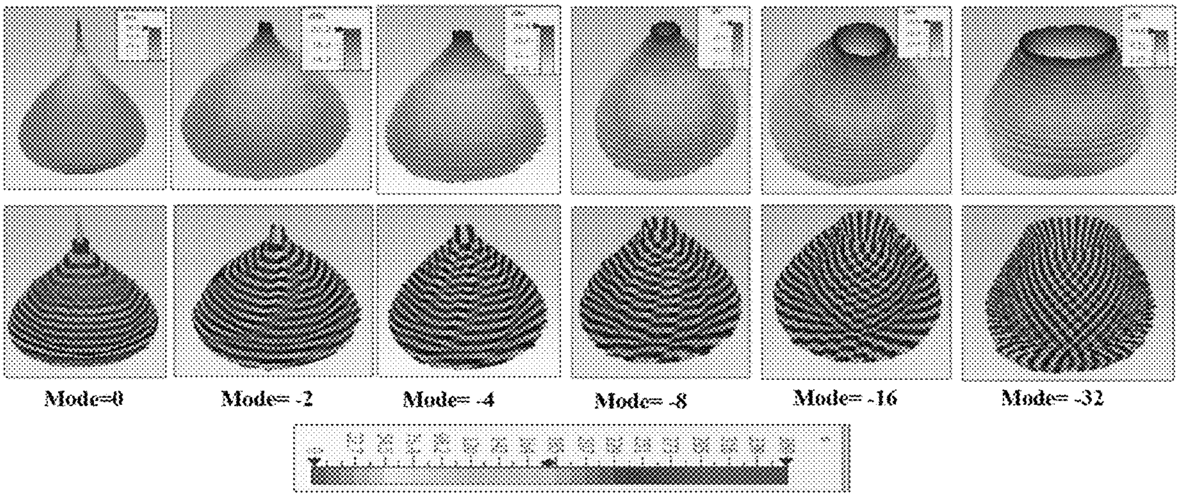
FIG. 14B shows simulated radiation patterns of a zero OAM mode and various negative OAM modes of a UCA comprising 128 dual CP waveguide antenna elements according to an implementation of the present disclosure.

FIGS. 14A and 14B show simulated radiation patterns of a zero OAM mode and various positive and negative OAM modes, respectively, of a UCA comprising 128 circularly-arranged dual CP waveguide antenna elements 60.

The radiation patterns in FIGS. 14A and 14B were generated using CST Microwave Studio (which is part of the CST Studio Suite®) using a simulated arrangement of dual CP waveguide antenna elements 60 similar to that in UCA 54 shown in FIGS. 6A and 6B.

The radiation patterns in the top row of FIG. 14A show the magnitude of RHCP gain of a zero OAM mode and various positive OAM modes of a UCA comprising 128 circularly-arranged dual CP waveguide antenna elements 60.

The radiation patterns in the bottom row of FIG. 14A show the phase of RHCP gain of a zero OAM mode and various positive OAM modes of a UCA comprising 128 circularly-arranged dual CP waveguide antenna elements 60.

The radiation patterns in the top row of FIG. 14B show the magnitude of RHCP gain of a zero OAM mode and various negative OAM modes of a UCA comprising 128 circularly-arranged dual CP waveguide antenna elements 60.

The radiation patterns in the bottom row of FIG. 14B show the phase of RHCP gain of a zero OAM mode and various negative OAM modes of a UCA comprising 128 circularly-arranged dual CP waveguide antenna elements 60.

As shown in FIGS. 14A and 14B, the radiation patterns of various OAM modes (−32, −16, −8, −4, −2, 0, +2, +4, +8, +16, and +32) for a UCA comprising 128 circularly-arranged dual CP waveguide antenna elements 60 display high directivity and generally uniform cone shape.

Figure 15:
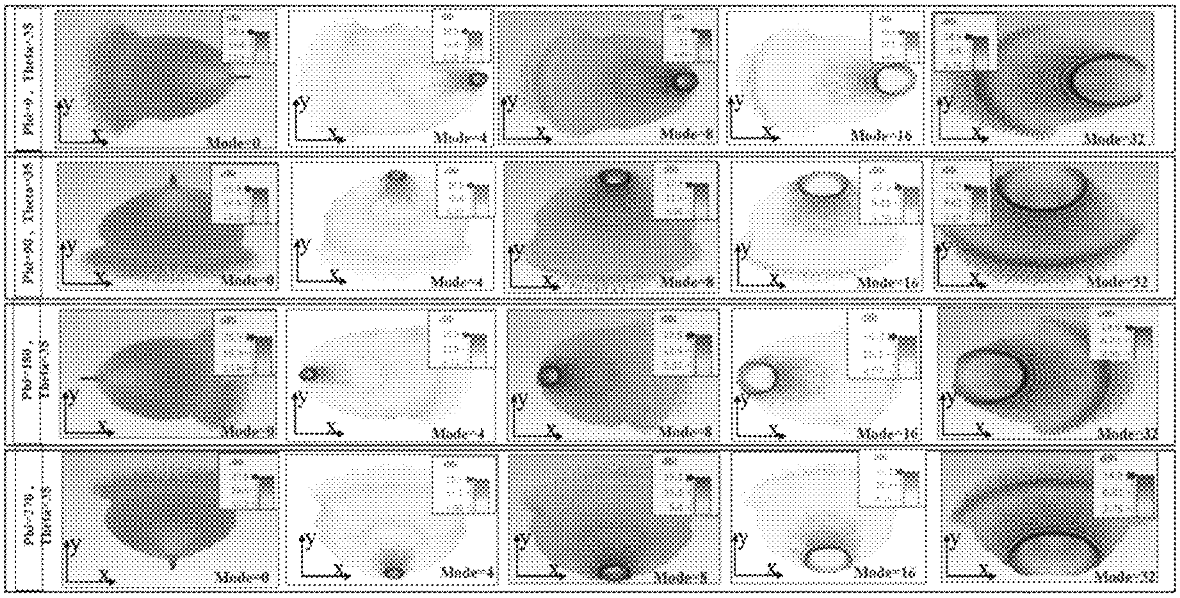
FIG. 15 shows simulated azimuth beam steering patterns of a zero OAM mode and various positive OAM modes of a UCA comprising 128 dual CP waveguide antenna elements according to an implementation of the present disclosure.

FIG. 15 shows simulated azimuth beam steering patterns of a zero OAM mode and various positive OAM modes of a UCA comprising 128 circularly-arranged dual CP waveguide antenna elements 60.

The azimuth beam steering patterns in FIG. 15 were generated using CST Microwave Studio (which is part of the CST Studio Suite®) using a simulated arrangement of dual CP waveguide antenna elements 60 similar to that in UCA 54 shown in FIGS. 6A and 6B.

FIG. 15 shows radiation patterns for OAM modes 0, +4, +8, +16, and +32 at phi angles (i.e. azimuth steering angle) of 0, 90, 180, and 270 degrees and at a constant theta angle (i.e. elevation steering angle) of 35 degrees. As indicated in the simulated patterns, the UCA comprising 128 circularly-arranged dual CP waveguide antenna elements 60 displays high directivity and generally uniform cone shape for the various azimuth beam steering angles tested.

Figure 16A:
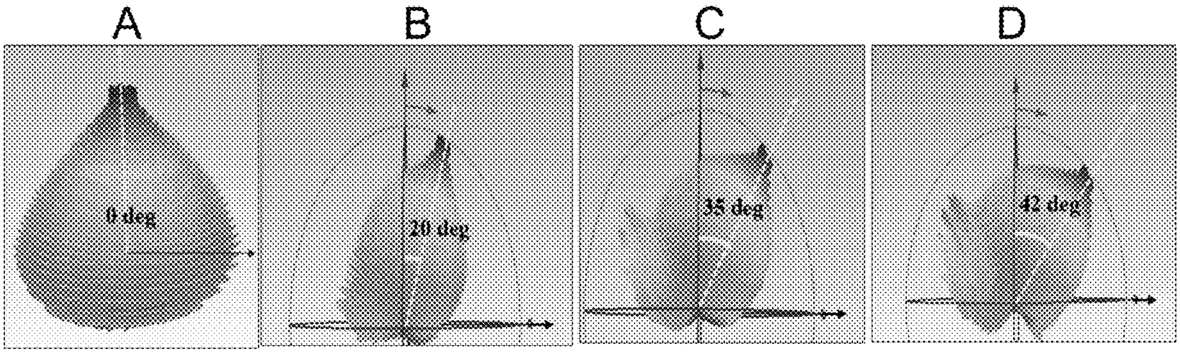
FIG. 16A shows simulated elevation beam steering patterns of OAM mode +4 of a UCA comprising 128 dual CP waveguide antenna elements according to an implementation of the present disclosure.

FIG. 16A shows simulated elevation beam steering patterns of an OAM +4 mode of a UCA comprising 128 circularly-arranged dual CP waveguide antenna elements 60.

The elevation beam steering patterns in FIG. 16A were generated using CST Microwave Studio (which is part of the CST Studio Suite®) using a simulated arrangement of dual CP waveguide antenna elements 60 similar to that in UCA 54 shown in FIGS. 6A and 6B.

Figure 16B:
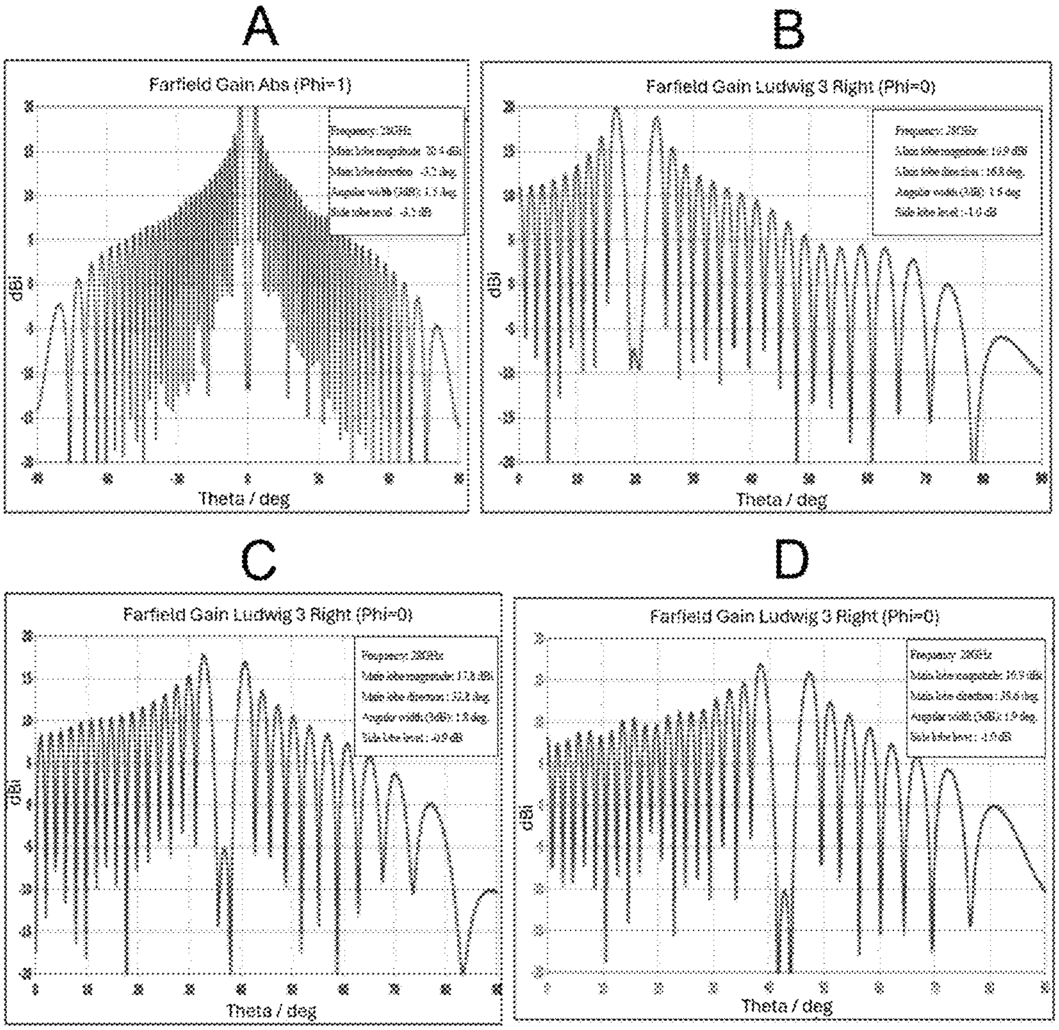
FIG. 16B shows radiation plots of the simulated elevation beam steering patterns shown in FIG. 16A.

FIG. 16B shows radiation plots of the simulated elevation beam steering patterns shown in FIG. 16A. The radiation plots in FIG. 16B were taken at an azimuth plane of 0 degrees.

The radiation patterns and plots in FIGS. 16A and 16B, respectively, show high directivity and generally uniform cone shape at 0 degree (plot "A"), 20 degree (plot "B"), 35 degree (plot "C"), and 42 degree (plot "D") elevation steering angles.

Figure 17:
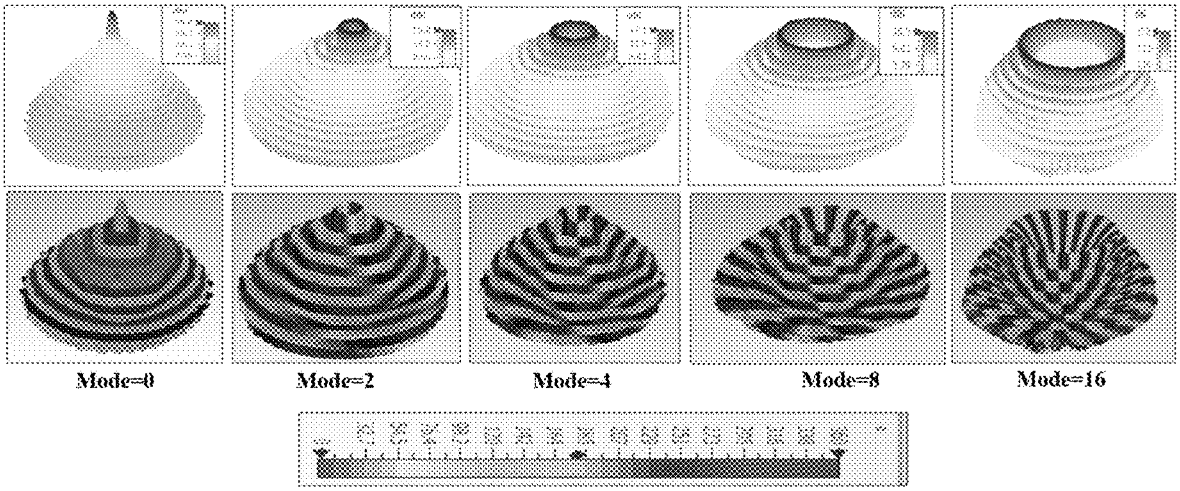
FIG. 17 shows simulated radiation patterns of a zero OAM mode and various positive OAM modes of a UCA comprising 64 dual CP waveguide antenna elements according to an implementation of the present disclosure.

FIG. 17 shows simulated radiation patterns of a zero OAM mode and various positive OAM modes of a UCA comprising 64 circularly-arranged dual CP waveguide antenna elements 60.

The radiation patterns in FIG. 17 were generated using CST Microwave Studio (which is part of the CST Studio Suite®) using a simulated arrangement of dual CP waveguide antenna elements 60 similar to that in UCA 52 shown in FIGS. 6A and 6B.

The radiation patterns in the top rows of FIG. 17 show the magnitude of RHCP gain of a zero OAM mode and various positive OAM modes of a UCA comprising 64 circularly-arranged dual CP waveguide antenna elements 60.

The radiation patterns in the bottom rows of FIG. 17 show the phase of RHCP gain of a zero OAM mode and various positive OAM modes of a UCA comprising 64 circularly-arranged dual CP waveguide antenna elements 60.

As shown in FIG. 17, the radiation patterns of a zero OAM mode and various positive OAM modes (+2, +4, +8, and +16) for a UCA comprising 64 circularly-arranged dual CP waveguide antenna elements 60 display high directivity and generally uniform cone shape.

Figure 18:
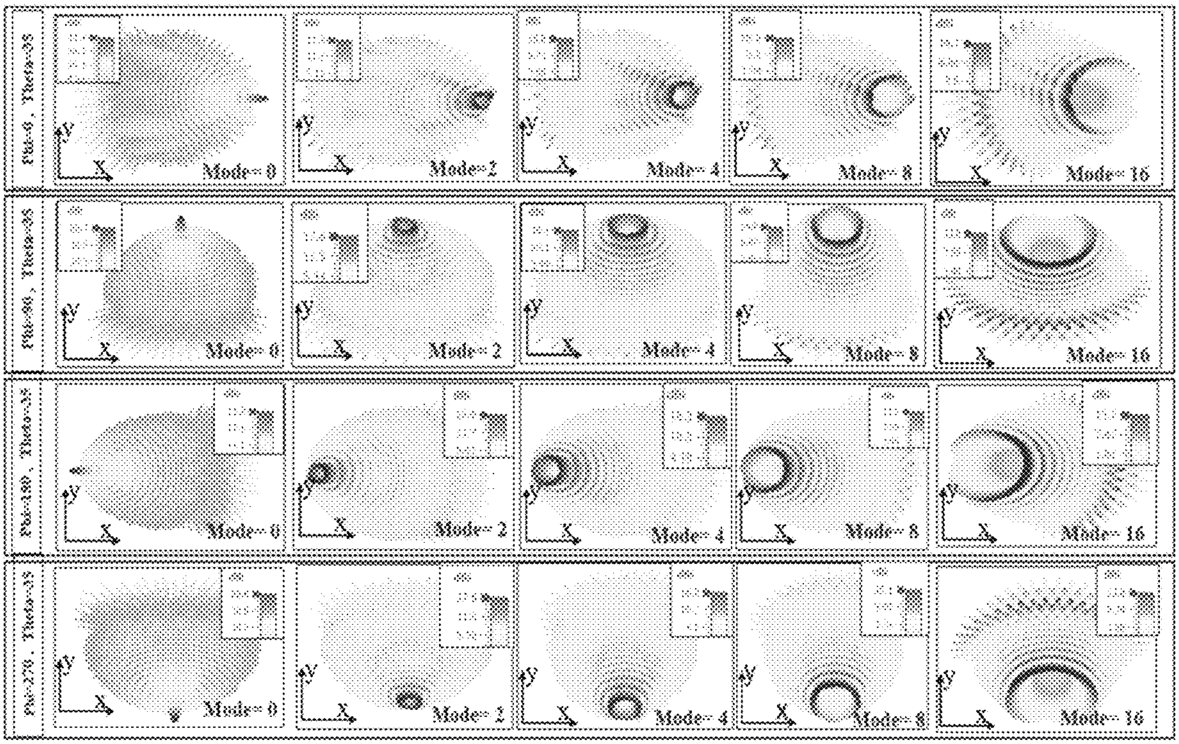
FIG. 18 shows simulated azimuth beam steering patterns of a zero OAM mode and various positive OAM modes of a UCA comprising 64 dual CP waveguide antenna elements according to an implementation of the present disclosure.

FIG. 18 shows simulated azimuth beam steering patterns of a zero OAM mode and various positive OAM modes of a UCA comprising 64 circularly-arranged dual CP waveguide antenna elements 60.

The azimuth beam steering patterns in FIG. 18 were generated using CST Microwave Studio (which is part of the CST Studio Suite®) using a simulated arrangement of dual CP waveguide antenna elements 60 similar to that in UCA 52 shown in FIGS. 6A and 6B.

FIG. 18 shows radiation patterns for OAM modes 0, +2, +4, +8, and +16 at phi angles (i.e. azimuth steering angle) of 0, 90, 180, and 270 degrees and at a constant theta angle (i.e. elevation steering angle) of 35 degrees. As indicated in the simulated patterns, the UCA comprising 64 circularly-arranged dual CP waveguide antenna element 60 displays high directivity and generally uniform cone shape for the various azimuth beam steering angles tested.

Figure 19A:
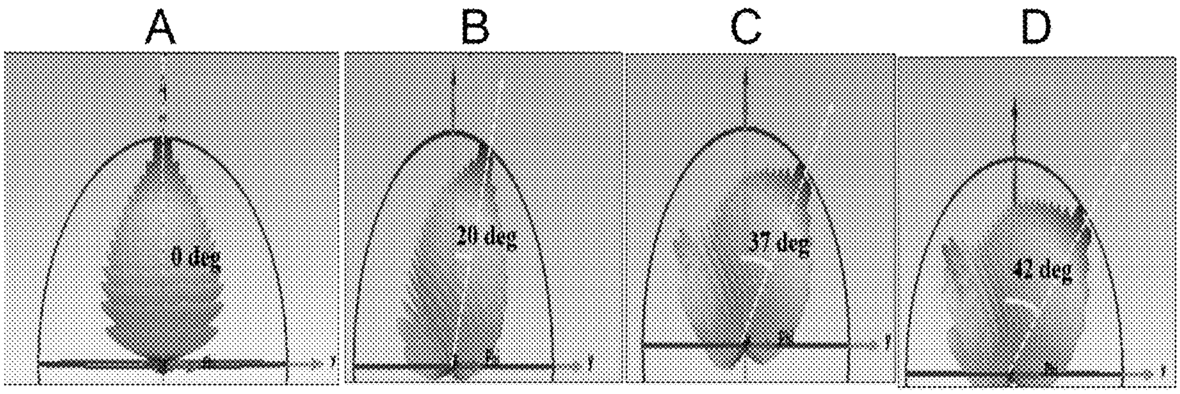
FIG. 19A shows simulated elevation beam steering patterns of OAM mode +2 of a UCA comprising 64 dual CP waveguide antenna elements according to an implementation of the present disclosure.

FIG. 19A shows simulated elevation beam steering patterns of OAM mode +2 of a UCA comprising 64 circularly-arranged dual CP waveguide antenna elements 60.

The elevation beam steering patterns in FIG. 19A were generated using CST Microwave Studio (which is part of the CST Studio Suite®) using a simulated arrangement of dual CP waveguide antenna elements 60 similar to that in UCA 52 shown in FIGS. 6A and 6B.

Figure 19B:
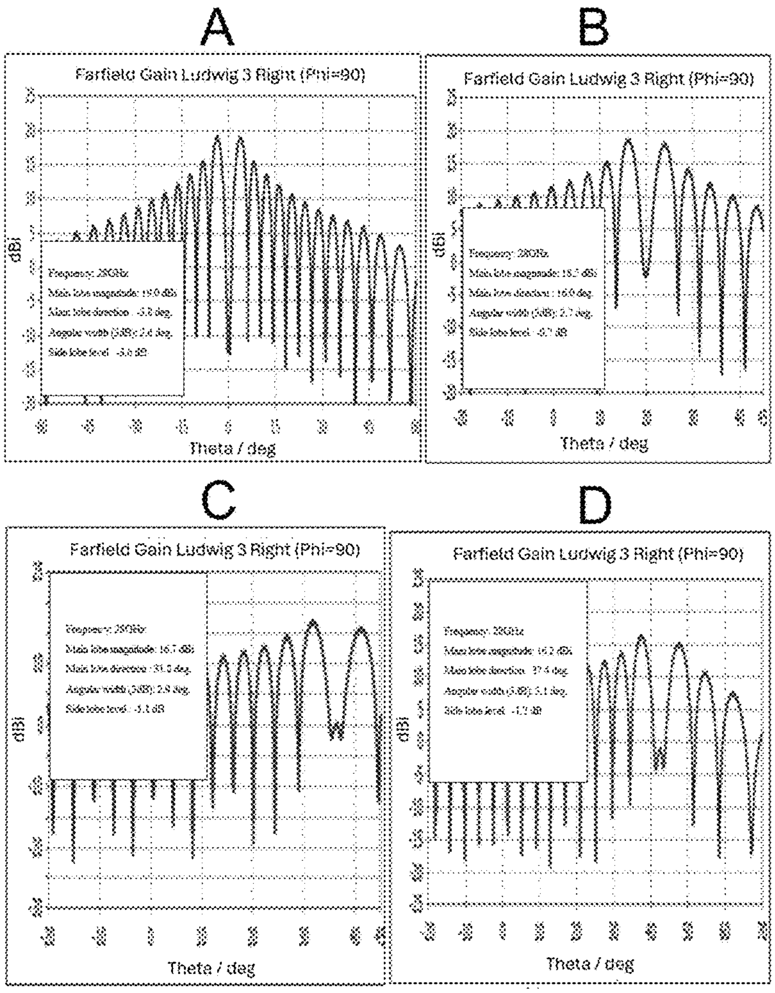
FIG. 19B shows radiation plots of the simulated elevation beam steering patterns shown in FIG. 19A.

FIG. 19B shows radiation plots of the simulated elevation beam steering patterns shown in FIG. 19A. The radiation plots in FIG. 19B were taken at an azimuth plane of 0 degrees.

The radiation patterns and plots in FIGS. 19A and 19B, respectively, show high directivity and generally uniform cone shape at 0 degree (plot "A"), 20 degree (plot "B"), 37 degree (plot "C"), and 42 degree (plot "D") elevation steering angles.

A method for calculating steering phases for different angles in a UCA will now be described.

Equation 2 allows the calculation of the phase shift ($\Delta\varnothing_n$) in degrees for an $n^{th}$ dual CP waveguide antenna element of a UCA comprising N number of circularly-arranged dual CP waveguide antenna elements:

$$\Delta\phi_n = \frac{360}{\lambda} \times R \times \sin\theta \times \cos(\phi - \phi_n) \tag{2}$$

Where R is the radius of the UCA, θ is the elevation angle (steering angle in the vertical plane, which is perpendicular to the horizontal plan), ¢ is the azimuth angle (steering angle in the horizontal plane, which is the same plane as the aperture of the UCA), A is the wavelength of the OAM beam, and $$\phi_n = \frac{360}{\lambda}$$

is the angular position of the $n^{th}$ dual CP waveguide antenna element around the UCA.

Notably, the term $$\frac{360}{\lambda}$$

in Equation 2 converts the phase shift from radians to degrees and accounts for the OAM beam wavelength. The term R×sin θ in Equation 2 represents the projection of the radius of the UCA onto the horizonal plane. Additionally, the term $\cos(\phi-\phi_n)$ in Equation 2 adjusts for the angular displacement of each dual CP waveguide antenna element along the UCA.

For example, given an OAM EM beam comprising a wavelength (λ) of 0.0107 m, a frequency of 28 GHz, an elevation steering angle (θ) of 30 degrees, and an azimuth steering angle (ϕ) of 0 degrees, and given an OAM beam steering antenna comprising 8 circularly arranged dual CP waveguide antenna elements (N=8) spaced apart at a distance (d) of λ/2, the phase shift ($\Delta\O_n$) for each dual CP waveguide antenna element can be calculated as follows.

First, using Equation 3, the radius (R) of the UCA is 0.00681 m:

$$R = \frac{N\lambda}{4\pi} \tag{3}$$

In the present example, the 8 dual CP waveguide antenna elements (n=0 to n=7) of UCA comprise an angular position (Øn) of 0, 45, 90, 90, 135, 180, 225, 270, and 315 degrees, respectively, around UCA. Using the variables notes above, the phase shift ($\Delta\O_n$) in degrees for each of the 8 dual CP waveguide antenna elements of a UCA can be calculated using Equation 2, said calculation presented in Table 1 below:

| n | $\O_n$ (deg) | $\Delta\O_n$ (deg) |
|---|---|---|
| 0 | 0 | 114.6 |
| 1 | 45 | 81.0 |
| 2 | 90 | 0.0 |
| 3 | 135 | 279.0 |
| 4 | 180 | 245.4 |
| 5 | 225 | 279.0 |
| 6 | 270 | 0.0 |
| 7 | 315 | 81.0 |

Accordingly, Equation 2 can be used to calculate the phase shift ($\Delta\O_n$) in degrees for steering a beam at a given angle (θ, ϕ) in a UCA.

Therefore, a skilled person in the art may use Equation 2 as a guide to design OAM beam steering antenna and systems according to implementations of the present disclosure. Notably, however, other equations or methods may also be used as a suitable guide to assist in the design of antennas and systems disclosed herein.

In the present disclosure, all terms referred to in singular form are meant to encompass plural forms of the same. Likewise, all terms referred to in plural form are meant to encompass singular forms of the same.

As used herein, the term "about" refers to an approximately +/−10% variation from a given value. It is to be understood that such a variation is always included in any given value provided herein, whether or not it is specifically referred to.

The terms "comprising," "containing," "having", "including", or the like, are to be understood as including but not limited to a particular list of parts, components, or steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via an electronic element depending on the particular context. The term "and/or" herein when used in association with a list of items means any one or more of the items comprising that list.

Although a combination of features is shown in the illustrated implementations, not all of them need to be combined to realize the benefits of various implementations of this disclosure. In other words, a system, apparatus or method designed according to an implementation of this disclosure will not necessarily include all features shown in any one of the Figures or all portions schematically shown in the Figures. Moreover, selected features of one example implementation may be combined with selected features of other example implementations. To assist in describing the invention disclosed herein, elements shown in any given figure may not necessarily be proportionate to one another.

The present disclosure is well adapted to attain the ends and advantages mentioned as well as those that are inherent therein. The particular implementations disclosed above are illustrative only, as the present disclosure may be modified and practiced in different but equivalent manners apparent to those skilled in the art having the benefit of the teachings herein. Although individual implementations are discussed, the disclosure covers all combinations of all those implementations. Furthermore, no limitations are intended to the details of construction or design herein shown, other than as described in the claims below. It is therefore evident that the particular illustrative implementations disclosed above may be altered or modified and all such variations are considered within the scope of the present disclosure. If there is any conflict in the usages of a word or term in this specification and one or more patent(s) or other documents that may be referenced herein, the definitions that are consistent with this specification should be adopted.

Many obvious variations of the implementations set out herein will suggest themselves to those skilled in the art in light of the present disclosure. Such obvious variations are within the full intended scope of the appended claims.

The invention claimed is:

1. An antenna for either or both transmitting and receiving an Orbital Angular Momentum (OAM) electromagnetic beam, the antenna comprising:

- a plurality of concentric arrays, each concentric array of the plurality of concentric arrays comprising:
  - a respective aperture; and
  - a respective plurality of dual circular-polarized waveguide antenna elements, each dual circular-polarized waveguide antenna element of the respective plurality of dual circular-polarized waveguide antenna elements comprising a top end and a bottom end for coupling to a feed structure; and
- one or more concentric electromagnetic signal confining structures, wherein, each neighboring pair of concentric arrays of the plurality of concentric arrays have at least one electromagnetic signal confining structure of the one or more electromagnetic signal confining structures therebetween.

2. The antenna of claim 1, wherein the respective bottom end of each dual circular-polarized waveguide antenna element comprises:

a first rectangularly arranged port for either or both transmitting and receiving one or more right-hand circular polarized components of the OAM electromagnetic beam;

a second rectangularly arranged port for either or both transmitting and receiving one or more left-hand circular polarized components of the OAM electromagnetic beam; and wherein, a partial wall separates the first and second rectangularly arranged ports.

3. The antenna of claim 2, wherein all concentric arrays of the plurality of concentric arrays are coplanar.

4. The antenna of claim 3, further comprising: a single central dual circular-polarized waveguide antenna element along a central axis of the antenna.

5. The antenna of claim 4, wherein:

the plurality of concentric arrays comprises:

a first concentric array comprising a first plurality of dual circular-polarized waveguide antenna elements; and a second concentric array surrounding the first concentric array, the second concentric array comprising a second plurality of dual circular-polarized waveguide antenna elements having double the dual circular-polarized waveguide antenna elements as compared to the first plurality of dual circular-polarized waveguide antenna elements;

the antenna comprising a central frequency and the OAM electromagnetic beam comprising a wavelength at the central frequency; and each neighboring pair of dual circular-polarized waveguide antenna elements in each plurality of concentric arrays are spaced apart at a distance of about half the wavelength.

6. The antenna of claim 5, further comprising:

an outer concentric electromagnetic signal confining structure surrounding the second concentric array; and an inner concentric electromagnetic signal confining structure surrounding the single central dual circular-polarized waveguide antenna element;

wherein the outer and inner concentric electromagnetic signal confining structures each comprise at least three decoupling rings.

7. The antenna of claim 6, further comprising a concentric electromagnetic signal confining structure comprising at least five decoupling rings between the first and second concentric arrays.

8. The antenna of claim 6, wherein:

the first concentric array is configured to transmit, receive, or both transmit and receive a first component of the OAM electromagnetic beam comprising a non-zero order OAM mode having an absolute value of up to 16; and the second concentric array is configured to transmit, receive, or both transmit and receive a second component of the OAM electromagnetic beam comprising a non-zero order OAM mode having an absolute value of up to 32; and the single central dual circular-polarized waveguide antenna element is configured to transmit, receive, or both transmit and receive a third component of the OAM electromagnetic beam comprising a zero order OAM mode.

9. The antenna of claim 1, wherein each concentric electromagnetic signal confining structure of the one or more concentric electromagnetic signal confining structures comprises:

five or more decoupling rings, each decoupling ring of the five or more decoupling rings concentric with the plurality of concentric arrays and comprising a depth of about ¼ of a wavelength of the OAM electromagnetic beam at a central frequency of the antenna.

10. The antenna of claim 1, wherein a diameter of the respective aperture of an outermost concentric array of the plurality of concentric arrays is about 40 times a wavelength of the OAM electromagnetic beam at a central frequency of the antenna.

11. The antenna of claim 1, configured to emit the OAM electromagnetic beam steerable at:

an azimuth steering angle ranging from about 0° to about 360°; and an elevation steering angle ranging from about −42° to about 42° measured from a central axis of the plurality of concentric arrays to a central axis of a beam conical of the emitted OAM electromagnetic beam.

12. The antenna of claim 1, wherein the respective aperture of each concentric array is sized such that a respective OAM beam component of the OAM electromagnetic beam, transmitted, received, or both transmitted and received by the respective concentric array has a same or similar cone angle.

13. The antenna of claim 1, further comprising an outermost concentric electromagnetic signal confining structure surrounding an outermost concentric array of the plurality of concentric arrays.

14. A system comprising:

one or more feed structures, each feed structure of the one or more feed structures comprising:

at least one main board;

at least one beam former; and at least one front-end module; and an antenna for either or both transmitting and receiving an OAM electromagnetic beam, the antenna comprising:

a plurality of concentric arrays, each concentric array of the plurality of concentric arrays comprising:

a respective aperture; and a respective plurality of dual circular-polarized waveguide antenna elements, each dual circular-polarized waveguide antenna element of the respective plurality of dual circular-polarized waveguide antenna elements comprising a top end and a bottom end coupled to one of the one or more feed structures; and one or more concentric electromagnetic signal confining structures, wherein, each neighboring pair of concentric arrays of the plurality of concentric arrays have at least one electromagnetic signal confining structure of the one or more electromagnetic signal confining structures therebetween.

15. The system of claim 14, wherein each feed structure of the one or more feed structures is configured, in a transmit configuration, to:

generate a plurality of respective OAM beam component signals; and provide each OAM beam component signal of the plurality of respective OAM beam component signals to at least one of the plurality of dual circular-polarized waveguide antenna elements of one of the plurality of concentric arrays, thereby causing the corresponding concentric array to emit a respective at least one OAM mode of the OAM electromagnetic beam directed according to provided beamsteering parameters.

16. The system of claim 14, wherein each feed structure of the one or more feed structures comprises at least one microstrip to waveguide transition.

17. The system of claim 14, wherein:

the at least one beam former of each feed structure of the one or more feed structures comprises one or more of a Butler matrix and a Rotman lens; and the at least one front-end module of each feed structure of the one or more feed structures comprises one or more variable phase shifters.

18. A method for generating and steering an Orbital Angular Momentum (OAM) electromagnetic beam, comprising:

generating, by each feed structure of one or more feed structures, a respective plurality of OAM beam component signals by processing a plurality of input signals in accordance with beamsteering parameters and a respective at least one OAM mode of the OAM electromagnetic beam; and providing each respective plurality of OAM beam component signals to an OAM electromagnetic beam antenna comprising:

a plurality of concentric arrays, each concentric array of the plurality of concentric arrays comprising:

a respective aperture; and a respective plurality of dual circular-polarized waveguide antenna elements, each dual circular-polarized waveguide antenna element of the respective plurality of dual circular-polarized waveguide antenna elements comprising a top end and a bottom end coupled to one of the one or more feed structures; and one or more concentric electromagnetic signal confining structures, wherein, each neighboring pair of concentric arrays of the plurality of concentric array have at least one electromagnetic signal confining structure of the one or more electromagnetic signal confining structures therebetween, wherein each respective plurality of OAM beam component signals is provided, via the one or more feed structures, to a corresponding concentric array of the plurality of concentric arrays; and emitting, by each corresponding concentric array of the plurality of concentric arrays, a respective OAM beam component of the OAM electromagnetic beam comprising the respective at least one OAM mode and directed according to the beamsteering parameters.

19. The method of claim 18, wherein:

the OAM electromagnetic beam antenna further comprises a single central dual circular-polarized waveguide antenna element along a central axis of the thereof; and wherein emitting, by each corresponding concentric array of the plurality of concentric arrays, the respective OAM beam component of the OAM electromagnetic beam comprising the respective at least one OAM mode and directed according to the beamsteering parameters further comprises:

emitting, by the single central dual circular-polarized waveguide antenna element, the respective OAM beam component comprising a zero order OAM mode of the OAM electromagnetic beam; and emitting, by each concentric array of the plurality of concentric arrays, the respective OAM beam component comprising the at least one non-zero order OAM mode of the OAM electromagnetic beam.

20. The method of claim 18, further comprising steering the emitted the OAM electromagnetic beam in accordance with the beamsteering parameters comprising:

an azimuth steering angle ranging from about 0° to about 360°; and an elevation steering angle ranging from about −42° to about 42° measured from a central axis of the plurality of concentric arrays to a central axis of a beam conical of the emitted OAM electromagnetic beam.

* * * * *